US006778981B2

(12) United States Patent
Lee et al.

(10) Patent No.: US 6,778,981 B2
(45) Date of Patent: Aug. 17, 2004

(54) APPARATUS AND METHOD FOR SIMILARITY SEARCHES USING HYPER-RECTANGLE BASED MULTIDIMENSIONAL DATA SEGMENTATION

(75) Inventors: Seok-Lyong Lee, Yongin-si (KR); Seok-Ju Chun, Seoul (KR); Deok-Hwan Kim, Seoul (KR); Chin-Wan Chung, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 302 days.

(21) Appl. No.: 10/106,668

(22) Filed: Mar. 22, 2002

(65) Prior Publication Data

US 2003/0097356 A1 May 22, 2003

(30) Foreign Application Priority Data

Oct. 17, 2001 (KR) ........................................ 2001-64075

(51) Int. Cl.⁷ ............................................. G06F 17/30
(52) U.S. Cl. ............................................. 707/3; 707/2
(58) Field of Search ............................... 707/1, 2, 3, 4, 707/5, 6, 7, 8, 9, 10, 100, 101, 107, 103, 104.1; 702/27

(56) References Cited

U.S. PATENT DOCUMENTS

| | | | | |
|---|---|---|---|---|
| 5,940,825 | A | * | 8/1999 | Castelli et al. .................. 707/6 |
| 6,122,628 | A | * | 9/2000 | Castelli et al. .................. 707/5 |
| 6,289,354 | B1 | * | 9/2001 | Aggarwal et al. ....... 707/104.1 |
| 6,453,246 | B1 | * | 9/2002 | Agrafiotis et al. ............ 702/27 |
| 6,496,817 | B1 | * | 12/2002 | Whang et al. .................. 707/2 |
| 6,598,054 | B2 | * | 7/2003 | Schuetze et al. ........ 707/103 R |

OTHER PUBLICATIONS

An article entitled "Fast Subsequence Matching in Time–Series Databases," by Faloutsos et al., pp. 419–429. This article discloses a fast subsequence matching in time–series databases.
An article entitled "Similarity–Based Queries for Time Series Data," By Rafiei et al., pp. 13–25. This article discloses similarity–based queries for time series data.
An article entitled "On Similarity–Based Queries for Time Series Data," By Davood Rafiei. This article discloses on similarity–based queries for time series data.

* cited by examiner

Primary Examiner—Diane D. Mizrahi
Assistant Examiner—Yicun Wu
(74) Attorney, Agent, or Firm—Bachman & LaPointe, P.C.

(57) ABSTRACT

Disclosed herein is an apparatus and method for similarity searches using hyper-rectangle based multidimensional data segmentation. The similarity search apparatus has MBR generation means, first sequence pruning means, second sequence pruning means, and subsequence finding means. The MBR generation means segments a multidimensional data sequence to be partitioned into subsequences, and represents each subsequence by each Minimum Bounding Rectangle (MBR), such that sets of MBRs are generated from the multidimensional data sequence, and the MBR sets are stored in a database. The first sequence pruning means prunes irrelevant data sequences using a distance $D_{mbr}$ between MBRs extracted from an inputted query sequence and the MBR sets stored in the database in a multidimensional Euclidean space. The second sequence pruning means prunes irrelevant data sequences using a normalized distance $D_{norm}$ between MBRs extracted from the query sequence and the MBR sets of data sequences remaining after the data sequences are pruned in a multidimensional Euclidean space. The subsequence finding means detects subsequences similar to the given query sequence by obtaining sets of points contained in MBRs involved in a calculation of the distance $D_{norm}$ from each sequence obtained using the distance $D_{norm}$.

18 Claims, 14 Drawing Sheets

APPARATUS AND METHOD FOR SIMILARITY SEARCHES USING HYPER-RECTANGLE BASED MULTIDIMENSIONAL DATA SEGMENTATION

BACKGROUND OF THE INVENTION

1. Field of the Invention

The present invention relates generally to an apparatus and method for similarity searches using a hyper-rectangle based multidimensional data segmentation, and more particularly to an apparatus and method which can efficiently perform the segmentation with respect to data sets representable by multidimensional data sequences (MDS's), such as video streams, and can search for similarity using the segmentation.

2. Description of the Prior Art

For the past several years, time-series data have been thoroughly studied in database applications such as data mining and data warehousing. Time-series data are a series of real numbers, which represent values at time points. For example, the time-series data can be a sequence of real numbers such as the prices of stocks or commercial goods, weather patterns, sales indicators, biomedical measurements, and etc.

The examples of the time-series data are disclosed in detail in a thesis entitled "Similarity-Based queries for time series data" (May, 1997) by "D. Rafei, A. Medelzon" and published in "Proceedings of ACM SIGMOD Int'l Conference on Management of Data". However, because such example values are basically one-dimensional data, most research still concentrates on indexes and searches for one-dimensional data sequences.

As the use of multimedia data has spread to many application domains, the efficient retrieval of multidimensional, voluminous and complex information, which are the intrinsic characteristics of multimedia data, is becoming increasingly important. The present invention, as described later, belongs to retrieval technology areas for data represented by sequences, such as time-series data and multimedia data, in accordance with this retrieval requirement.

In the prior art, various similarity search methods for time-series data have been proposed.

First, there is a whole sequence matching method. This method is described in detail in a thesis entitled "Efficient Similarity Search in Sequence Databases" by "R. Agrawal, C. Faloutsos, A. Swami" and published in "Proceedings of Foundations of Data Organizations and algorithms (FODO)". The method is problematic in that two sequences to be compared must be of equal length. That is, the method maps the time sequences into the frequency domain, and uses the Discrete Fourier Transform (DFT) to solve the dimensionality curse problem. In this case, each sequence whose dimensionality is reduced by using the DFT is mapped into a lower-dimensional point in the frequency domain, and is indexed and stored using R*-Tree. However, this method is limited in that a database sequence and a query sequence must be of equal length, as described above.

Second, there is a fast subsequence matching method. This method is disclosed in detail in a thesis entitled "Fast Subsequence Matching in Time-Series Databases" by "C. Faloutsos, M. Ranganathan, Y. Manolopoulos" and published in "Proceedings of ACM SIGMOD Int'l Conference on Management of Data (May, 1994.)". The basic idea of this method is that, using a sliding window with a size of w with respect to a data sequence, it represents w one-dimensional values included in each window by a single w-dimensional point, and transforms a one-dimensional data sequence into a lower-dimensional sequence using the DFT. The lower-dimensional data sequence is partitioned into subsequences. In this case, each subsequence is represented by a Minimum Bounding Rectangle (MBR) and is indexed and stored using "ST-index". On the other hand, a query sequence is divided into one or more subsequences each with a size of w, each of which is represented by a w-dimensional point. The query processing is based on the MBRs of a data sequence stored in a database and each query point.

However, a point in the multidimensional sequence such as video sequences is semantically different from that of one-dimensional time-series data. In the multidimensional sequence, a point itself is a vector in the multidimensional space which has various feature values.

A query in a query process of the multidimensional sequence is given as a multidimensional sequence, and the query sequence is also divided into multiple subsequences. In one-dimensional sequence, each query subsequence is represented by a single point. However, in the multidimensional sequence, each subsequence cannot be represented by a single point, (because each point contained in each subsequence is multidimensional), such that this method cannot be used in the similarity search of the multidimensional sequence.

Further, this method performs clustering (or segmentation) based on a Marginal COST (MCOST) defined as the average number of disk accesses (DA) divided by the number of points in the MBR. That is, if a point is to be included in the cluster or MBR during the segmentation process, this algorithm considers the volume increment of the cluster due to the point included in the cluster as an important clustering factor in determining the MCOST. However, because the algorithm only considers the volume factor, it is insufficient to cover all of possible cases.

Third, there is a method using a set of safe linear transformations of a given sequence. This method is disclosed in detail in a thesis entitled "Similarity—Based queries for time series data (May, 1997)" by "D. Rafei, A. Mendelzon" and published in "Proceedings of ACM SIGMOD Int'l Conference on Management of Data".

The set of safe linear transformations of the given sequence can be used as the basis of similarity queries for time-series data. Elements of this set formulate functions such as moving average, reversing and time warping. At this time, such transformation functions are extended to multiple transformations, where an index is searched for only once and a collection of transformations are simultaneously applied to the index, instead of searching for the index multiple times and each time applying a single transformation.

However, all of the above proposed methods handle the similarity search for one-dimensional time-series data, such that the methods cannot be applied to the multidimensional data sequence. Further, these methods are problematic in that they only focus on the problem of searching a database for candidate sequences whose similarities to a query sequence do not exceed a given threshold.

Meanwhile, a similarity search method for multidimensional data sequence, as proposed later in the present invention, uses a hyper-rectangle based segmentation, and technical fields related to the hyper-rectangle based segmentation are described as follows.

A clustering problem has been considerably studied in many database applications such as customer segmentation, sales analysis, pattern recognition and similarity search. The task of clustering data points is defined as follows: "Given a set of points in a multidimensional space, partition the points into clusters such that points within each cluster have similar characteristics while points in different clusters are dissimilar. At this time, a point that is considerably dissimilar to or inconsistent with the remainder of the data is referred to as an outlier."

Conventional methods for clustering data points in a multidimensional space can include the following methods.

First, there is a method named "CLARANS" proposed in a thesis entitled "Efficient and effective clustering methods for spatial data mining" by "R. T. Ng and J. Han" and published in "Proceedings of Int'l Conference on Very Large Data Bases". The CLARANS method is based on a randomized search method and achieves its efficiency by reducing the search space using two user-supplied input parameters.

Second, there is a method named "BIRCH" proposed in a thesis entitled "BIRCH: An efficient data clustering method for very large databases" by "T. Zhang, R. Ramakrishnan, and M. Livny" and published in "Proceedings of ACM SIGMOD Int'l Conference on Management of Data". The "BIRCH" method is a multiphase clustering method for constructing a hierarchical data structure called CF (clustering feature)-tree by scanning a database. Further, the BIRCH uses an arbitrary clustering algorithm so as to cluster leaf nodes of the CF-tree. Such a method is the first approach that effectively handles outliers in the database area.

Third, there is a method named "DBSCAN" proposed in a thesis entitled "A density-based algorithm for discovering clusters in large spatial databases with noise" by "M. Ester, H. P. Kriegel, J. Sander, and X. Xu" and published in "Int'l Conference on Knowledge Discovery in Databases and Data Mining". The "DBSCAN" method tries to minimize requirements of domain knowledge to determine input parameters and provides arbitrary shapes of clusters based on the distribution of data points. The basic idea of the method is that for each point in a cluster, the neighborhood of the point within a given radius should contain at least a given number of points. Therefore, the method requires only two input parameters (i.e., radius and the minimum number of points).

Fourth, there is a method named "CLIQUE" proposed in a thesis entitled "Automatic subspace clustering of high dimensional data for data mining applications" by "R. Agrawal, J. Gehrke, D. Gunopulos, and P. Raghavan" and published in "Proceedings of ACM SIGMOD Int'l Conference on Management of Data". "CLIQUE" is a method for automatically identifying dense clusters in subspaces of a given high-dimensional data space. That is, the method is suitable where even though a cluster is not detected in a given space, the cluster can exist in the subspaces. Further, the method needs the size of the grid for partitioning the space and the global density threshold for clusters as the input parameters.

Fifth, there is a method named "CURE" proposed in a thesis entitled "CURE: An efficient clustering algorithm for large databases" by "S. Guha, R. Rastogi, and Shim" and published in "Proceedings of ACM SIGMOD Int'l Conference on Management of Data". The "CURE" as a recent approach identifies clusters having non-spherical shapes and wide variances in size. In such a method, each cluster is represented with multiple well-scattered points. The shape of a non-spherical cluster is better represented when more than one point are used. Such a clustering algorithm finishes the clustering process when the number of generated clusters reaches a given value as an input parameter.

However, the conventional clustering methods require multiple input parameters, and do not consider temporal and semantic relationship between data points. Consequently, the conventional clustering methods are problematic in that they cannot be applied to the clustering methods of data sequences such as video clips, in which temporal and semantic relationship between frames are regarded as important.

SUMMARY OF THE INVENTION

Accordingly, the present invention has been made keeping in mind the above problems occurring in the prior art, and an object of the present invention is to provide an apparatus and method, which partitions a multidimensional data sequence, such as a video stream, into segments in consideration of the temporal relationship between points, and efficiently searches a database for a multidimensional data sequence similar to a given query sequence.

In accordance with one aspect of the present invention, the above object can be accomplished by the provision of an apparatus for hyper-rectangle based multidimensional data similarity searches, the multidimensional data being representable by a multidimensional data sequence, comprising MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; first sequence pruning means for pruning irrelevant data sequences using a distance $D_{mbr}$ between MBRs extracted from an inputted query sequence and the MBR sets stored in the database in a multidimensional Euclidean space; second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points contained in MBRs involved in a calculation of the distance $D_{norm}$ from each sequence obtained using the distance $D_{norm}$.

In accordance with another aspect of the present invention, there is provided an apparatus for hyper-rectangle based multidimensional data similarity searches, comprising MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; first sequence pruning means for pruning irrelevant data sequences using a distance Door between MBRs extracted from an inputted query sequence and the MBR sets stored in the database in a multidimensional Euclidean space; second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points contained in MBRs involved in a calculation of the distance $D_{norm}$ from each sequence obtained using the distance $D_{norm}$; wherein the MBR generation means includes threshold calculation means for inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle containing all points in the sequence $S_i$, segment generation means for initializing a segment set and an outlier set to empty sets and generating a current segment using a first point of the sequence $S_i$, geometric condition determination means for determining whether a next point of the sequence $S_i$ satisfies a geometric condition using the bounding threshold values for the volume and the edge, segment merging means for merging the next point of the sequence $S_i$ into the current segment if geometric condition is satisfied, and segment updating means for including the current segment in the segment set and re-generating a new current segment using the next point of the sequence $S_i$, if the geometric condition is not satisfied and the number of points contained in the current segment exceeds the minimum number of points per segment minPts.

In accordance with still another aspect of the present invention, there is provided an apparatus for hyper-rectangle based multidimensional data similarity searches, comprising MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; first sequence pruning means for pruning irrelevant data sequences using a distance $D_{mbr}$ between MBRs extracted from an inputted query sequence and the MBR sets stored in the database in a multidimensional Euclidean space; second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points contained in MBRs involved in a calculation of the distance $D_{norm}$ from each sequence obtained using the distance $D_{norm}$; wherein the MBR generation means includes threshold calculation means for inputting a multidimensional sequence $S_i$ and the minimum number of points per segment minPts, and calculating bounding threshold values for a volume and a semantic factor using a unit hyper-cube occupied by a single point in n-dimensional unit space, if points are uniformly distributed in a hyper-rectangle which is a minimum bounding rectangle containing all points in the sequence $S_i$, segment generation means for initializing a segment set and an outlier set to empty sets and generating a current segment using a first point of the sequence $S_i$, geometric and semantic condition determination means for determining whether a next point of the sequence $S_i$ satisfies geometric and semantic conditions using the bounding threshold values for the volume and the semantic factor, segment merging means for merging the next point of the sequence $S_i$ into the current segment if the geometric and semantic conditions are satisfied, and segment updating means for including the current segment in the segment set and re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided an apparatus for hyper-rectangle based multidimensional data similarity searches, comprising MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; first sequence pruning means for pruning irrelevant data sequences using a distance $D_{mbr}$ between MBRs extracted from an inputted query sequence and the MBR sets stored in the database in a multidimensional Euclidean space; second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points contained in MBRs involved in a calculation of the distance $D_{norm}$ from each sequence obtained using the distance $D_{norm}$; wherein the MBR generation means includes threshold calculation means for inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle containing all points in the sequence $S_i$, segment generation means for initializing a segment set and an outlier set to empty sets and generating a current segment using a first point of the sequence $S_i$, geometric and semantic condition determination means for determining whether a next point of the sequence $S_i$ satisfies geometric and semantic conditions using the bounding threshold values for the volume, the edge and the semantic factor, segment merging means for merging the next point of the sequence $S_i$ into the current segment if the geometric and semantic conditions are satisfied, and segment updating means for including the current segment in the segment set and re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided a method for a hyper-rectangle based multidimensional data similarity searches, the multidimensional data being representable by a multidimensional data sequence, comprising the steps of segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; pruning irrelevant data sequences using a distance $D_{mbr}$ between MBRs extracted from an inputted query sequence and the MBR sets stored in the database in a multidimensional Euclidean space; pruning irrelevant data sequences using a normalized distance $D_{norm}$ between MBRs extracted from the query sequence and the MBR sets of data sequences remaining after the data sequences are pruned in a multidimensional Euclidean space; and finding subsequences similar to the given query sequence by obtaining sets of points contained in MBRs involved in a calculation of the distance $D_{norm}$ from each sequence obtained using the distance $D_{norm}$.

In accordance with still another aspect of the present invention, there is provided a method for a hyper-rectangle based multidimensional data similarity searches, comprising the steps of segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; pruning irrelevant data sequences using a distance $D_{mbr}$ between MBRs extracted from an inputted query sequence and the MBR sets stored in the database in a multidimensional Euclidean space; pruning irrelevant data sequences using a normalized distance $D_{norm}$ between MBRs extracted from the query sequence and the MBR sets of data sequences remaining after the data sequences are pruned in a multidimensional Euclidean space; and finding subsequences similar to the given query sequence by obtaining sets of points contained in MBRs involved in a calculation of the distance $D_{norm}$ from each sequence obtained using the distance $D_{norm}$; wherein the MBR generation step includes the steps of inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle containing all points in the sequence $S_i$, initializing a segment set and an outlier set to empty sets and generating a current segment using a first point of the sequence $S_i$, determining whether a next point of the sequence $S_i$ satisfies a geometric condition using the bounding threshold values for the volume and the edge, merging the next point of the sequence $S_i$ into the current segment if the geometric condition is satisfied, and including the current segment in the segment set and updating the segment set by re-generating a new current segment using the next point of the sequence $S_i$, if the geometric condition is not satisfied and the number of points contained in the current segment exceeds the minimum number of points per segment minPts.

In accordance with still another aspect of the present invention, there is provided a method for a hyper-rectangle based multidimensional data similarity searches, comprising the steps of segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; pruning irrelevant data sequences using a distance $D_{mbr}$ between MBRs extracted from an inputted query sequence and the MBR sets stored in the database in a multidimensional Euclidean space; pruning irrelevant data sequences using a normalized distance $D_{norm}$ between MBRs extracted from the query sequence and the MBR sets of data sequences remaining after the data sequences are pruned in a multidimensional Euclidean space; and finding subsequences similar to the given query sequence by obtaining sets of points contained in MBRs involved in a calculation of the distance $D_{norm}$ from each sequence obtained using the distance $D_{norm}$; wherein the MBR generation step includes the steps of inputting a multidimensional sequence $S_i$ and the minimum number of points per segment minPts and calculating bounding threshold values for a volume and a semantic factor using a unit hyper-cube occupied by a single point in n-dimensional unit space, if points are uniformly distributed in a hyper-rectangle which is a minimum bounding rectangle containing all points in the sequence $S_i$, initializing a segment set and an outlier set to empty sets and generating a current segment using a first point of the sequence $S_i$, determining whether a next point of the sequence $S_i$ satisfies geometric and semantic conditions using the bounding threshold values for the volume and the semantic factor, merging the next point of the sequence $S_i$ into the current segment if the geometric and semantic conditions are satisfied, and including the current segment in the segment set and updating the segment set by re-generating a new current segment using the next point of the sequence $S_i$, if the geometric and semantic conditions are not satisfied and the number of points contained in the current segment exceeds the minimum number of points per segment minPts.

In accordance with still another aspect of the present invention, there is provided a method for a hyper-rectangle based multidimensional data similarity searches, comprising the steps of segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database; pruning irrelevant data sequences using a distance $D_{mbr}$ between MBRs extracted from an inputted query sequence and the MBR sets stored in the database in a multidimensional Euclidean space; pruning irrelevant data sequences using a normalized distance $D_{norm}$ between MBRs extracted from the query sequence and the MBR sets of data sequences remaining after the data sequences are pruned in a multidimensional Euclidean space; and finding subsequences similar to the given query sequence by obtaining sets of points contained in MBRs involved in a calculation of the distance $D_{norm}$ from each sequence obtained using the distance $D_{norm}$; wherein the MBR generation step includes the steps of inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle containing all points in the sequence $S_i$, initializing a segment set and an outlier set to empty sets and generating a current segment using a first point of the sequence $S_i$, determining whether a next point of the sequence $S_i$ satisfies geometric and semantic conditions using the bounding threshold values for the volume, the edge and the semantic factor, merging the next point of the sequence $S_i$ into the current segment if the geometric and semantic conditions are satisfied, and including the current segment in the segment set and updating the segment set by re-generating a new current segment using the next point of the sequence $S_i$, if the geometric and semantic conditions are not satisfied and the number of points contained in the current segment exceeds the minimum number of points per segment minPts.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Queries such as "Identify companies whose stock prices show similar movements during the last year to that of a given company" or "Determine products with similar selling patterns similar to a given product" can be made as similarity queries of a typical one-dimensional sequence. In the present invention, queries of a multidimensional sequence such as "Find video streams that are similar to a given stream of news video" can be given as queries on video streams or images, aside from the above two queries.

Data sources such as video streams or images are properly parsed to generate multidimensional data, and each sequence is partitioned into subsequences. Further, each subsequence is represented by a Minimum Bounding Rectangle (MBR), and MBRs are indexed and stored into a database using R-trees or index trees modified from the R-trees so as to process queries.

On the other hand, the R-trees are described in detail in a thesis entitled "R-Trees: a dynamic index structure for spatial searching" by "A. Guttman" and published in "Proceedings of ACM SIGMOD Int'l Conference on Management of Data".

Further, a query sequence is also divided into one or more MBRs upon which query processing is based. In order to handle the similarity search between MBRs, two similarity measures are proposed in the present invention. Further, the present invention proposes algorithms for minimizing "False Hit", that is, a case where any thing not required is searched for while guaranteeing the correctness of "No False Dismissal". Here, the "False Dismissal" is a case where any thing required is not searched for.

Figure 1:
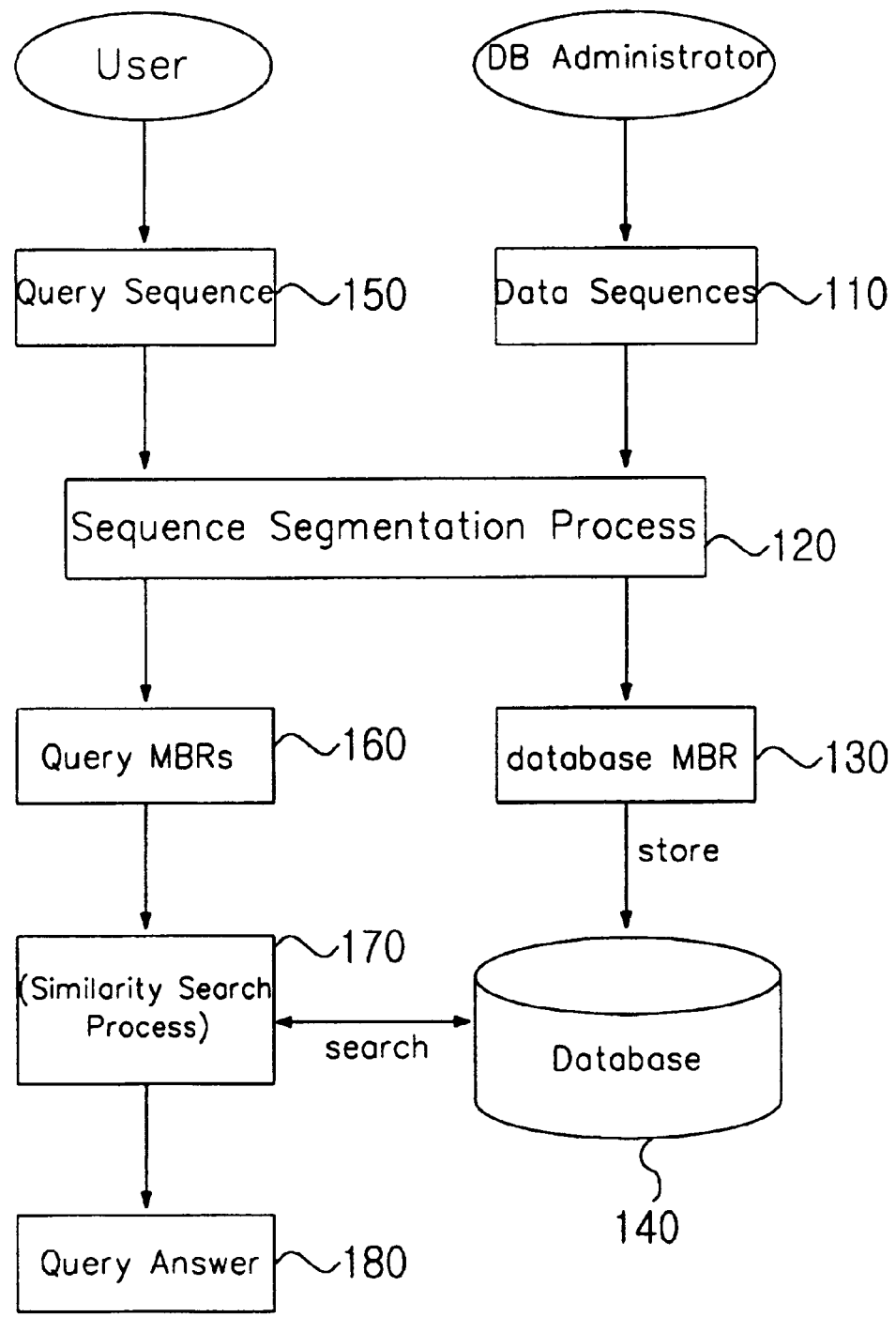
FIG. 1 is a view showing a similarity search method for a multidimensional data sequence using hyper-rectangle based segmentation from a user's and administrator's points of view according to a preferred embodiment of the present invention.

FIG. 1 is a view showing a similarity search method for a multidimensional data sequence using hyper-rectangle based segmentation from user and administrator's points of view according to a preferred embodiment of the present invention. The above similarity search method is described in detail, as follows.

First, in a database (DB) administrator's view, data sequences 110 are generated from plural pieces of source data which are inputted or stored. After the data sequences 110 are processed in a sequence segmentation process 120, the processed data are converted into formats of data MBR 130, and then the converted data are stored in a database 140. On the other hand, in user's view, when a query sequence 150 is inputted from the user, the query sequence is processed in the sequence segmentation process 120. After the sequence segmentation process 120, the processed data are converted into formats of query MBRs 160, and a similarity search process 170 is processed between the data MBRs 130 stored in the database 140 and the query MBRs 160. Then, after the similarity search process 170, a query answer 180 is outputted.

Hereinafter, the construction and operation of the similarity search method proposed in the present invention is described according to items.

1. Nature of Multidimensional Data Sequence

First, symbols used in the present invention are summarized as follows.

S: data sequence in a database

S[i]: ith entry of S

S[i:j]: subsequence of S from entry i to j

Q: query sequence $Mbr_k(S)$: kth MBR of S $\epsilon$: user-specified threshold d(*,*): Euclidean distance between two multidimensional points D (*,*): distance between two sequences $D_{mean}(*,*)$: mean distance between two sequences of equal length $D_{mbr}(*,*)$: distance between two MBRs $D_{norm}(*,*)$: normalized distance between two MBRs A multidimensional data sequence can be represented by a trail of points in multidimensional data space. Definition 1 below is the formal definition for the multidimensional data sequence.

[Definition 1]

A multidimensional data sequence S is defined as a series of its component vectors, that is, S=(S[1], S[2], . . . S[k]). Here, each vector S[k] is composed of n scalar entries, and expressed as S[k]=(S[k, 1], S[k, 2], . . . S[k, n]).

Time-series data are regarded as a special case of the multidimensional sequence by replacing each element S[k] of S with a one-dimensional scalar component in Definition 1. Therefore, time-series data become a sequence of real numbers each representing a value at a time point.

The similarity between two objects each represented by a vector in a multidimensional space is generally defined as a function of the Euclidean distance between those two vectors. For example, images or video frames are represented as feature vectors, such as color, texture, or shape, and the similarity between images or video frames can be described as a function of the distance between the corresponding feature vectors. The value range of the similarity between two objects is usually [0,1], while the range of the distance is [0,∞]. As the two objects are similar, the distance therebetween approaches "0", while, as two objects are quite different, the distance therebetween becomes larger.

On the contrary, the similarity is different from the distance. Specifically, as two objects are similar, the similarity approaches "1", while, as two objects are dissimilar, it approaches "0". The distance between two objects can be transformed into the similarity by an appropriate mapping function. Assuming that the data space is normalized in the $[0,1]^n$ hyper-cube, the length of each dimension is "1" in this cube, such that the maximum allowable distance between two objects is $\sqrt{n}$, the diagonal length of the cube. Accordingly, the distance between two objects can be easily mapped into the similarity. In order to measure the similarity, the Euclidean distance is used for simplicity.

Then, consider a distance between two multidimensional data sequences. The distance between two arbitrary points in each n-dimensional sequences $S_1$ and $S_2$ is given by Equation [1] below.

$$d(S_1[i], S_2[i]) = \left( \sum_{1 \leq t \leq n} |S_1[i, t] - S_2[i, t]|^2 \right)^{1/2} \quad [1]$$

Here, $S_1[i]$ and $S_2[j]$ are ith and jth points of $S_1$ and $S_2$, respectively.

However, the distance between sequences has different semantics from the distance between points. Each multidimensional data sequence is comprised of a number of multidimensional points. It is not preferable to use the sum of distances between all pairs of points in the two sequences to represent the distance between two sequences. This is because even though any two sequences are similar in fact, if there are a large number of points contained in the sequences, two similar sequences with more points may produce the greater distance value than dissimilar sequences with fewer points. This is clearly shown in Example 1 below.

EXAMPLE 1

Figure 2:
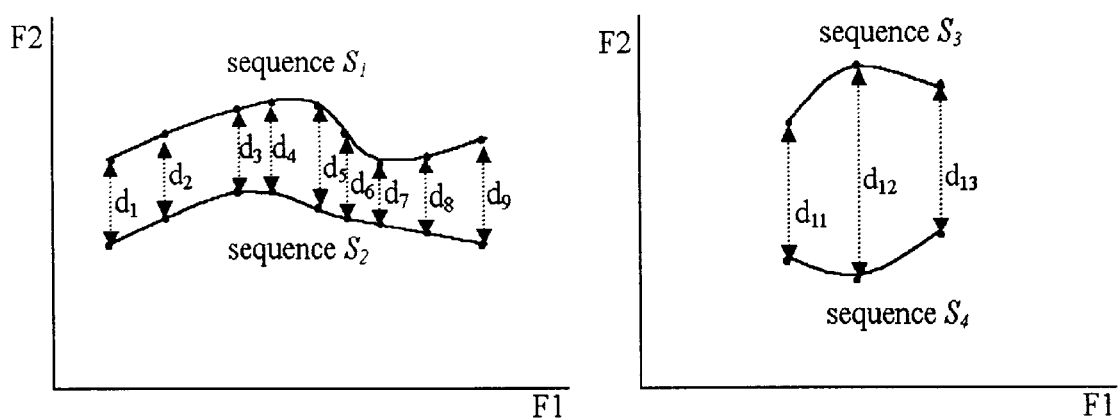
FIG. 2 is a graph showing each distance between sequences if a pair of sequences $S_1$ and $S_2$ are each comprised of nine points and a pair of sequences $S_3$ and $S_4$ are each comprised of three points.

FIG. 2 is a view showing each distance between sequences if a pair of sequences $S_1$ and $S_2$ are each comprised of nine points and a pair of sequences $S_3$ and $S_4$ are each comprised of three points.

As intuitively shown in FIG. 2, because points in the pair of sequences $S_1$ and $S_2$ are placed closer than those of the pair of sequences $S_3$ and $S_4$, the sequences $S_1$ and $S_2$ are more similar than the sequences $S_3$ and $S_4$. However, provided that the sum of distances between each pair of points in the sequences is set as the similarity measure, it appears as if the sequences $S_3$ and $S_4$ are closer (more similar) than the sequences $S_1$ and $S_2$. This shows that the sum of the distances between points contained in two sequences is not appropriate for the similarity measure of sequences.

In the present invention, the distance between two sequences is proposed as a first distance measure. First, a distance between two sequences having the same length is defined, and next a distance between two sequences having different lengths is defined, as described in Definitions 2 and 3 below.

[Definition 2]

The distance D $(S_1, S_2)$ between two multidimensional sequences $S_1$ and $S_2$ of equal length, each having k points, is defined as the mean distance of the two sequences $S_1$ and $S_2$, as described in Equation [2] below.

$$D(S_1, S_2) = D_{mean}(S_1, S_2) = \frac{\sum_{1 \leq i \leq k} d(S_1[i], S_2[i])}{k} \quad [2]$$

Next, consider a case that two sequences are different from each other in length and then the points between two sequences do not correspond to each other. In this case, the distance between the two sequences is calculated by comparing a short sequence with a long sequence while sliding the short sequence from the beginning to the end. The shortest distance of each pair is defined as the distance between the two sequences, and described in Definition 3 as follows.

[Definition 3]

Assuming that two multidimensional sequences $S_1$ and $S_2$ contain k and m points (k≦m), respectively, and have different lengths, the distance $D(S_1, S_2)$ between two multidimensional sequences $S_1$ and $S_2$ is defined as the minimum mean distance between all possible subsequences of sequences $S_1$ and $S_2$ and defined as the following Equation [3].

$$D(S_1, S_2) = \min_{1 \leq j \leq m-k+1} D_{mean}(S_1[1:k], S_2[j:j+k-1]) \quad [3]$$

2. Distance between MBRs

In order to measure the distance between MBRs, an MBR distance $D_{mbr}$ between two MBRs is introduced. Generally, MBR M in the n-dimensional Euclidean space is represented by two endpoints L (low point) and H (high point) of a major diagonal of a hyper-rectangle and defined as M=(L, H). Here, L and H are defined as $L=(l_1, l_2, \ldots, l_n)$ and $H=(h_1, h_2, \ldots, h_n)$, respectively, where $l_i \leq h_i$ (1≦i≦n).

Figure 3:
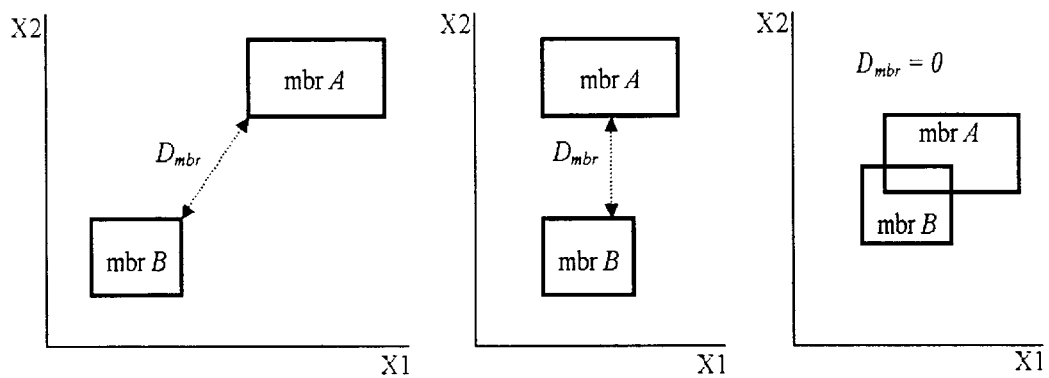
FIG. 3 is a graph showing a distance between two MBRs in two-dimensional space according to a preferred embodiment of this invention.

FIG. 3 is a view showing the distance between two MBRs in the two-dimensional space according to a preferred embodiment of this invention. Referring to FIG. 3, the distance between two MBRs in the two-dimensional space is expressed, depending on their relative placement. The distance for the two-dimensional space can be easily extended to the n-dimensional space, and the following Definition 4 is constructed.

[Definition 4]

The MBR distance $D_{mbr}$ between two MBRs, that is, $A=(L_A, H_A)$ and $B=(L_B, H_B)$ in the n-dimensional Euclidean space is defined as the minimum distance between two hyper-rectangles, and defined as the following Equation 4.

$$D_{mbr}(A, B) = \left( \sum_{1 \leq k \leq n} \chi_k^2 \right)^{1/2} \quad [4]$$

$$\chi_k = \begin{pmatrix} |h_{A,k} - l_{B,k}| & \text{if } h_{A,k} < l_{B,k} \\ |l_{A,k} - h_{B,k}| & \text{if } h_{B,k} < l_{B,k} \\ 0 & \text{otherwise} \end{pmatrix}$$

On the other hand, provided that two MBRs A and B contain sequences $S_1$ and $S_2$, respectively, the MBR distance Doer between two MBRs is shorter than the distance between any pair of points, one in the sequence $S_1$ and the other in the sequence $S_2$. In other words, the following Equation 5 is constructed.

$$D_{mbr}(A, B) \leq \min_{a \in S_1, b \in S_2} d(a, b) \quad [5]$$

Meanwhile, the following Lemma 1 is derived from the above descriptions.

[Lemma 1]

The shortest MBR distance $D_{mbr}$ between any pair of two MBRs in a query sequence Q and a data sequence S is the lower bound of the distance D (Q, S) between two sequences. Then, assuming that N and R are sets of MBRs respectively included in the sequences Q and S, the following Equation [6] is constructed.

$$\min_{i \in N, j \in R} D_{mbr}(mbr_i(Q), mbr_j(S)) \leq D(Q, S) \quad [6]$$

Further, provided that the sequences Q and S have k and l points, respectively, and $k \leq l$, the following Equation [7] is constructed.

$$D(Q, S) = \min_{1 \leq u \leq l-k+1} D_{mean}(Q[1:k], S[u:u+k-1]) \quad [7]$$

$$= \min_{1 \leq u \leq l-k+1} \left( \sum_{1 \leq v \leq k} d(Q[v], S[u+v-1])/k \right)$$

Further, assuming that $\delta$ is the shortest distance between two arbitrary points, one in the sequence Q and the other in the sequence S, the following Equation [8] is constructed.

$$D(Q, S) = \min_{1 \leq u \leq l-k+1} \left( \sum_{1 \leq v \leq k} d(Q[v], S[u+v-1])/k \right) \geq (k * \delta / k) = \delta \quad [8]$$

On the other hand, the following Equation [9] is constructed depending on the Equation [5].

$$\delta \geq \min_{i \in N, j \in R} D_{mbr}(mbr_i(Q), mbr_j(S)) \quad [9]$$

$$D(Q, S) \geq \min_{i \in N, j \in R} D_{mbr}(mbr_i(Q), mbr_j(S))$$

Therefore, if $D(Q, S) \leq \epsilon$, there certainly exist a and b satisfying that $a \in N, b \in R$, and $D_{mbr}(mbr_a(Q), mbr_b(S)) \leq \epsilon$.

Based on Lemma 1, because the distance $D_{mbr}$ between two MBRs is the lower bound for the distance D(Q, S) between two sequences, the distance $D_{mbr}$ can be used to prune the database of irrelevant sequences without "False Dismissal".

A next introduced distance function is the normalized distance $D_{norm}$ between two MBRs, which considers the number of points in an MBR.

The normalized distance $D_{norm}$ between a query MBR ($mbr_q$) and a target MBR ($mbr_t$) in a data sequence considers not only the $D_{mbr}$ between the $mbr_q$ and $mbr_t$, but the distances $D_{mbr}$s between $mbr_q$ and the neighboring MBRs of the target MBR $mbr_t$ (if the number of points in $mbr_t$ is less than that of $mbr_q$). The neighboring MBRs of $mbr_t$ are included one by one in the calculation of $D_{norm}$ until the number of points in MBRs participated in the calculation of $D_{norm}$ reaches the number of points in $mbr_q$.

Figure 4:
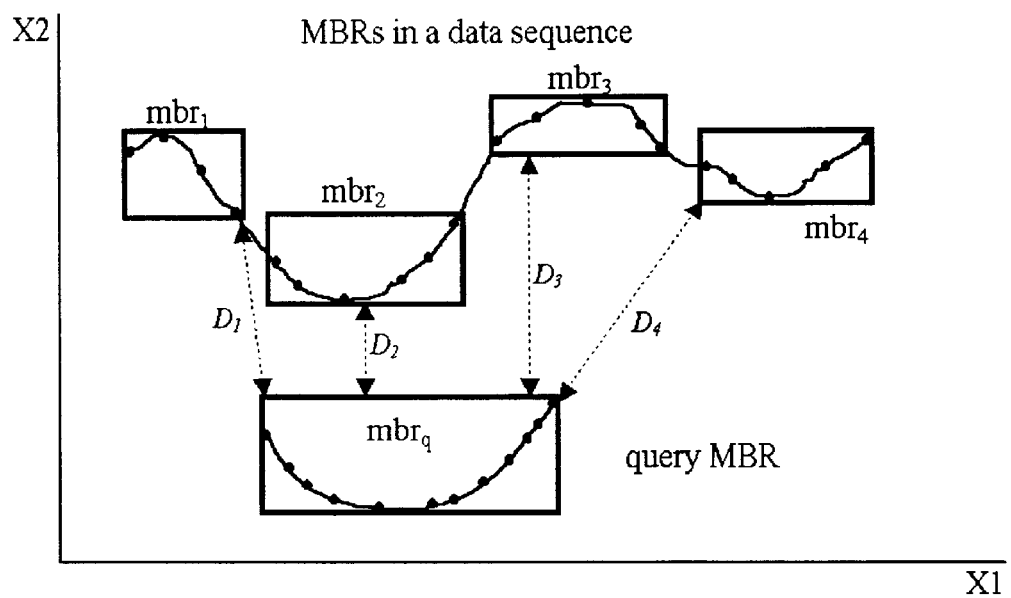
FIG. 4 is a graph intuitively showing the normalized distance $D_{norm}$ of this invention.

FIG. 4 is a view intuitively showing the normalized distance $D_{norm}$ according to a preferred embodiment of this invention, and $D_{norm}$ is described as follows.

As shown in FIG. 4, assume that the data sequence S is divided into four MBRs, that is, $mbr_j$ (j=1, 2, 3 and 4), and $D_j$ ($D_2 < D_1 < D_3 < D_4$) is the MBR distance $D_{mbr}$ between $mbr_j$ and the query MBR. The number of points in $mbr_j$ is 4, 6, 5 and 5 for j=1, 2, 3 and 4, respectively, and the number of points in $mbr_q$ is 12. In this case, the normalized distance $D_{norm}$ ($mbr_q$, $mbr_2$) between two MBRs $mbr_q$ and $mbr_2$ is defined as the following Equation [10].

$$D_{norm}(mbr_q, mbr_2) = \frac{\text{weighted disrance for } mbr_q}{\# \text{ points} \in mbr_q} \quad [10]$$

$$= \frac{(D_2 \times 6) + (D_1 \times 4) + (D_3 \times 2)}{12}$$

If the number of points in $mbr_2$ is equal to or greater than that in the $mbr_q$, $D_2$ is the $D_{norm}$. Otherwise, one of two MBRs adjacent to $mbr_2$, which has the shorter distance $D_{mbr}$ is selected (here, $D_1$ is selected). If the total number of points involved in the calculation of $D_{norm}$ still does not reach the number of points in $mbr_q$, the next adjacent MBR having the shorter Dmbr is selected by checking the distance $D_{mbr}$ between two adjacent MBRs again, such that $D_{norm}$ is calculated. This process continues until the total number of points involved in the calculation of $D_{norm}$ reaches the number of points in the $mbr_q$.

On the other hand, $D_{norm}$ is exactly described by the following Definition 5.

[Definition 5]

Assuming that the number of MBRs in the data sequence S is r, and k, l, p and q are indexes of MBRs of the data sequence S such that $1 \leq k \leq j \leq l \leq r$ and $1 \leq p \leq j \leq q \leq r$, the normalized distance $D_{norm}$ between two MBRs is defined by Equation [11] as follows.

$$D_{norm}(mbr_i(Q), mbr_j(S)) = \min_{\substack{k \leq j \leq l \\ p \leq j \leq q}} \{LD_{mbr}(mbr_i(Q), \{mbr_k(S), \ldots, mbr_l(S)\}), RD_{mbr}(mbr_i(Q), \{mbr_p(S), \ldots, mbr_q(S), \ldots, mbr_q(S)\})\} \quad (11)$$

where $$LD_{mbr}(mbr_i(Q), \{mbr_k(S), \ldots, mbr_l(S)\}) = \frac{D_{mbr}(mbr_i(Q), mbr_l(S)) \cdot \left(|q_i| - \sum_{t=k}^{l-1} |m_t|\right) + \sum_{s=k}^{l-1} D_{mbr}(mbr_i(Q), mbr_S(S)) \cdot |m_s|}{|q_i|},$$

$$RD_{mbr}(mbr_i(Q), \{mbr_p(S), \ldots, mbr_q(S)\}) = \frac{D_{mbr}(mbr_i(Q), mbr_p(S)) \cdot \left(|q_i| - \sum_{i=p+1}^{q} |m_i|\right) + \sum_{s=p+1}^{q} D_{mbr}(mbr_i(Q), mbr_S(S)) \cdot |m_s|}{|q_i|}$$

Here, $q_i$ is the set of points of Q in the ith MBR, and $m_j$ is the set of points of S in the jth MBR. At this time, the following Equation [12] is assumed.

$$\sum_{s=k}^{l-1} |m_s| < |q_1|, \sum_{s=k}^{l} |m_s| \geq |q_1|, \sum_{s=p+1}^{a} |m_s| < |q_i|, \sum_{s=p}^{a} |m_s| \geq |q_i| \quad [12]$$

A first objective for obtaining the distance $D_{norm}$ which is the distance measure is to provide a lower bound greater than the $D_{mbr}$ which is the distance between MBRs so as to promote the pruning of irrelevant sequences from the database. A second objective thereof is to find subsequences within a given threshold value from each selected candidate sequence. Both the following Lemmas 2 and 3 show that the normalized distance $D_{norm}$ guarantees "No False Dismissal" while pruning irrelevant sequences from the database.

[Lemma 2]

Consider that Q is a query sequence composed of a single MBR mbr(Q), and S' is a subsequence of S having the same length as Q. Because S' is composed of one or more MBRs $mbr_k(S)$ ($1 \leq k \leq s$), the following Equation [13] is constructed.

$$\min_{l \leq k \leq s} D_{norm}(mbr(Q), mbr_k(S)) \leq D(Q, S') \quad [13]$$

The above Equation [13] is proven as follows. Provided that $D_k$ is an MBR distance between mbr(Q) and $mbr_k(S)$, and $m_q$ and $m_k$ are respectively sets of points in mbr(Q) and $mbr_k(S)$, a set of indexes of MBRs in the sequence S involved in the calculation of $D_{norm}$ is a subset of $\{l, l+1, \ldots, s\}$. Further, if $\hat{m}_k$ is a set of points in the $mbr_k(S)$ actually involved in the calculation of $D_{norm}$, a formula $|m_q|=|\hat{m}_l|+|\hat{m}_{l+1}|+ \ldots |\hat{m}_s|$ is constructed. Depending on the above Equation [5], each MBR distance $D_k$ is shorter than the distance between any pair of points, one in the query sequence Q and the other in the subsequence S', and so the following Equation [14] is constructed.

$$\min_{l \leq k \leq s} D_{norm}(mbr(Q), mbr_k(S)) = \frac{D_l \times |\hat{m}_l| + \ldots + D_S \times |\hat{m}_s|}{|m_q|} \leq D(Q, S') \quad [14]$$

[Lemma 3]

If a query sequence is composed of multiple MBRS, the lower bounding distance $D_{norm}$ is defined as follows. The shortest normalized distance $D_{norm}$ between any pair of MBRs, one in the query sequence Q and the other in the data sequence S, is the upper bound of the shortest distance $D_{mbr}$ between two sequences and is the lower bound of the distance D (Q,S). If N and R are sets of MBRs in Q and S, respectively, the following Equation [15] is constructed.

$$\min_{i \in N, j \in R} D_{mbr}(mbr_i(Q), mbr_j(S)) \leq \quad [15]$$
$$\min_{i \in N, j \in R} D_{norm}(mbr_i(Q), mbr_j(S)) \leq D(Q, S)$$

The above Lemma 3 is proven as follows. Assume that $D_{norm}$ has the minimum value at i=x and j=y, and a set of indexes of MBRs in a sequence S involved in the calculation of the distance $D_{norm}$ is defined as $\{1, \ldots, y, \ldots, s\}$. Here, if $q_i$ and $m_j$ are respectively sets of points in $mbr_i(Q)$ and $mbr_j(S)$, the number of points involved in the calculation of $D_{norm}$ at the marginal MBR (i=l or j=s) may be less than $|m_l|$ or $|m_s|$, respectively, according to the Definition [5]. Here, $|\hat{m}_l|$ and $|\hat{m}_s|$ are the numbers of points actually involved in the calculation of $D_{norm}$ for $mbr_l(S)$ and $mbr_s(S)$, Equations $|\hat{m}_l| \leq |m_l|$, $|\hat{m}_s| \leq |m_s|$, and $|q_x|=|\hat{m}_l|+|m_{l+1}|+ \ldots +|\hat{m}_s|$ are constructed, and consequently the following Equation [16] is satisfied.

If $$D_k = D_{mbr}(mbr_i(Q), mbr_k(S)), \min_{i \in N, j \in R} D_{mbr}(mbr_i(Q), mbr_j(S)) = C_1, \quad [16]$$

$$\min_{i \in N, j \in R} D_{norm}(mbr_i(Q), mbr_j(S)) = D_{norm}(mbr_x, mbr_y)$$

$$= \frac{D_l \times |\hat{m}_l| + \ldots + D_y \times |m_y| + \ldots + D_s \times |\hat{m}_s|}{|q_x|}$$

$$\geq \frac{C_1 \times |\hat{m}_l| + \ldots + C_1 \times |m_y| + \ldots + C_1 \times |\hat{m}_s|}{|q_x|} = C_1$$

Accordingly, it can be seen that the above Equation [15] is constructed.

Next, it is proven that the shortest normalized distance $D_{norm}$ between any pair of MBRs, one in the query sequence Q and the other in the data sequence S, is the lower bound of the distance D (Q,S) between two sequences. Assume that the shortest distance $D_{norm}$ is $C_2$, and sequences Q and S have the minimum mean distance at the intervals Q[1:k] and S[h: h+k−1], respectively. Further, assume that the interval Q[1:k] is partitioned into subsequences $Q^i$ ($1 \leq i \leq n$) which are contained in $mbr_i(Q)$, and further, the interval S[h: h+k−1] is partitioned into subsequences $S^i$ ($1 \leq i \leq n$), such that $Q^i$ and $S^i$ have the same length for $1 \leq i \leq n$. In this case, if $S^i$ is contained in the $mbr_t(S)$ ($1 \leq t \leq s$), the following Equation [17] is constructed for a pair of subsequences $Q^i$ and $S^i$ by Lemma 2.

$$D(Q^i, S^i) \geq \min_{l \leq t \leq s} D_{norm}(mbr_i(Q), mbr_t(S)) \geq \quad [17]$$
$$\min_{i \in N, j \in R} D_{norm}(mbr_i(Q), mbr_j(S)) = C_2$$

Therefore, the following Equation [18] is satisfied, such that the above Equation [15] is constructed.

$$D(Q, S) = D(Q[l:k], S[h:h+k-1]) \quad [18]$$

$$= \frac{\sum_{l \le i \le n} |m_i| \times D(Q^i, S^i)}{\sum_{l \le i \le n} |m_i|} \ge \frac{\sum_{l \le i \le n} |m_i| \times C_2}{\sum_{l \le i \le n} |m_i|} = C_2$$

3. Finding Subsequences

If a query such as "Select sequences containing the subsequences that are similar to a query sequence in a database, and report those subsequences" is given, the normalized distance $D_{norm}$ is used to find the answer subsequences. First, a solution interval (SI), that is, the interval of a data sequence containing subsequences within a given threshold with respect to the query sequence is defined as the following Definition 6.

[Definition 6]

The solution interval (SI) is defined as a set of points contained in subsequences whose distances from the query sequence are within a given threshold. In other words, the solution interval of S[1:m] with respect to the query sequence Q[1:k] is formally defined as the following Equation [19], where it is generally assumed that k≦m.

$$SI = \quad [19]$$

$$\left\{ \begin{array}{l} S[t] \mid S[t] \in S[p:q], S[p:q] \text{ is a subsequence of } S, \\ \text{such that } D(Q[1:k], S[j:j+k-1]) \le \varepsilon, \text{ for } p \le j \le q-k+1 \end{array} \right\}$$

Such a solution interval can be obtained by a sequential scan method. However, the sequential scan method may cause much overhead of a central processing unit (CPU). Therefore, in order to avoid the overhead, the normalized distance $D_{norm}$ is used to approximate the solution interval. When the normalized distance $D_{norm}$ between $mbr_q(Q)$ and $mbr_s(S)$ is calculated, one or more MBRs of a data sequence are involved in the calculation of $D_{norm}$. At this time, if $D_{norm}$ ($mbr_q(Q)$, $mbr_s(S)$)≦ε, the solution interval can be approximated as the set of all points involved in the calculation of $D_{norm}$.

Referring to FIG. 4, MBRs $mbr_1$, $mbr_2$ and $mbr_3$ of the data sequence are involved to calculate the normalized distance $D_{norm}$ ($mbr_q$, $mbr_2$). If $D_{norm}$ ($mbr_q$, $mbr_2$)≦ε, the solution interval SI can be approximated as a subsequence of the data sequence which is composed of four points of $mbr_1$, six points of $mbr_2$ and first two points of $mbr_3$.

That is, SI is defined as SI={all points contained in $mbr_1$ and $mbr_2$}∪{first two points contained in $mbr_3$}.

While the normalized distance $D_{norm}$ guarantees "No False Dismissal" for selecting candidate sequences from a database, it does not guarantee "No False Dismissal" for determining the approximation of the solution interval so as to find subsequences of each selected sequence.

However, the experimental results as described later show that the determination of the solution interval proves "Almost No False Dismissal" with the recall over 98%. "False dismissal" arises from the fact that few points between subsequences involved in the calculation of $D_{norm}$ may be missed from the approximation. In this case, a small amount of false dismissal does not cause a severe problem. In a real situation, when video detected through video search and browsing is displayed, the few false-dismissed points are included in the solution interval to be played, thus causing the same effect as "No False Dismissal"

4. Segmentation of Sequence

In order to effectively support the representation and the retrieval of MDS, clustering (or segmentation) techniques must satisfy various requirements. Those requirements are categorized into two classes as follows: the geometric characteristics of clusters (or segments), and the temporal and semantic relationship between elements in a cluster.

First, the cluster should be dense with respect to the volume and the edge of a cluster for the efficient retrieval. This can be realized by minimizing the volume and the length of edge of a cluster per point, and maximizing the number of points per cluster.

Next, the temporal and semantic relation between elements in the cluster must be maintained even if the clustering is completed. That is, information on temporal ordering of elements in the cluster must be preserved, and elements in a cluster must be semantically similar.

Besides these requirements, the clustering technique must deal with outliers appropriately and minimize the number of input parameters to the clustering algorithm. In consideration of these requirements, the clustering problem proposed in the present invention can be formalized as follows.

Given: A data set of MDS's and the minimum number of points minPts per segment

Goal: To find the sets of segments and outliers that optimize the values of predefined measurement criteria.

Here, the input parameter minPts is needed to determine the outliers. If a segment has points less than a given minPts after the segmentation process, all points in the segment are regarded as the outliers.

In the sequence segmentation method proposed in the present invention, an MDS is partitioned into segments such that predefined geometric and semantic criteria are satisfied. Outliers are also identified in this process.

Another important property of the method proposed in the present invention is that most parameter values required for clustering are determined using the characteristics of the sequence, not supplied as external variables by the user. This property provides advantages in the following two aspects.

First, a method proposed in the present invention requires only one input parameter, that is, the minimum number of points per segment minPts. Generally, because it is not easy to get the domain knowledge in advance so as to set clustering parameters, such as the number of clusters to be generated or the minimum distance between clusters, it is desirable to minimize the number of input parameters.

Second, the method proposed in the present invention generates clusters considering the properties of a sequence, such as the type of video. For example, the scenes of a news video are not frequently changed while those of a cartoon or an animation film are frequently changed. The object of generating the clusters having such a difference can be achieved by setting parameters required for the clustering process different.

After the multidimensional sequence is generated, each sequence is partitioned into subsequences, and each subsequence is contained in the MBR or segment. Sequence segmentation is a process for generating MBRs by continuously merging a point of the sequence into an MBR if the predefined criteria are satisfied. Consider a case that a point P is merged into an MBR mbr in the unit space $[0, 1]^n$.

The segmentation proceeds such that if the merging of the point P into the MBR mbr satisfies the predefined conditions, the point P is merged into the mbr of a current subsequence, otherwise, a new subsequence is started from the point P. Further, the algorithm proposed in the present invention detects outliers, wherein the outliers cause a distorted partition when the sequence is partitioned into MBRs from noise in the sequence. In other words, the volume or the edge of the MBR is undesirably increased due to the outliers, which decreases the efficiency of retrieval.

Therefore, there is a need to exclude such outliers from the partition process. The MBR is redefined as the following Definition 7 in consideration of k points contained in the MBR.

[Definition 7]

An MBR or HR containing k points $P_j$(j=1, 2, . . . , k) in the temporal order in the n-dimensional space is defined as the following Equation [20].

$$MBR = \langle L, H, k \rangle \quad [20]$$

$$L = \left\{ (L^1, L^2, \ldots, L^n) \mid L^i = \min_{1 \leq j \leq k} P^i_j \right\}$$

$$H = \left\{ (H^1, H^2, \ldots, H^n) \mid H^i = \max_{1 \leq j \leq k} P^i_j \right\}$$

$$i = 1, 2, \ldots, n$$

Further, the points $P_j$ can be represented in the hyper-rectangular form for convenience by placing $L^i = H^i = P^i_j$ for all dimensions. That is, the MBR is represented as $<P_j, P_j, 1>$. Such a rectangle is also denoted by $HR(P_j)$ which has zero volume and edge. On the other hand, the volume Vol (HR) and the total edge length Edge (HR) of the hyper-rectangle HR are defined as the following Equation [21].

$$\text{Vol}(HR) = \prod_{1 \leq i \leq n} (HR \cdot H^i - HR \cdot L^i) \quad [21]$$

$$\text{Edge}(HR) = 2^{n-1} \sum_{1 \leq i \leq n} (HR \cdot H^i - HR \cdot L^i)$$

Meanwhile, the following three parameters are used as quantitative measures used to evaluate the quality of clustering.

VPP: Volume of clusters Per Point
EPP: Edge of clusters Per Point
PPC: Number of Points per Cluster The above three parameters are defined as the following Equation [22].

$$VPP = \frac{\sum_{1 \leq j \leq p} \text{Vol}(HR_j)}{\sum_{1 \leq j \leq p} HR_j \cdot k} \quad [22]$$

$$EPP = \frac{\sum_{1 \leq j \leq p} \text{Edge}(HR_j)}{\sum_{1 \leq j \leq p} HR_j \cdot k}$$

$$PPC = \frac{\sum_{1 \leq j \leq p} HR_j \cdot k}{p}$$

Accordingly, the volume of clusters per point VPP (HR) and the edge of clusters per point EPP (HR) of the hyper-rectangle HR are calculated as the following Equation [23].

$$VPP(HR) = \frac{\text{Vol}(HR)}{HR \cdot k} = \frac{\prod_{1 \leq i \leq n}(HR \cdot H^i - HR \cdot L^i)}{HR \cdot k} \quad [23]$$

$$EPP(HR) = \frac{\text{Edge}(HR)}{HR \cdot k} = \frac{2^{n-1} \sum_{1 \leq i \leq n}(HR \cdot H^i - HR \cdot L^i)}{HR \cdot k}$$

Two hyper-rectangles can be merged during the sequence segmentation process. In order to perform this merging operation, a merging operator is defined as the following Definition 8.

[Definition 8]

The merging operator $\oplus$ between two hyper-rectangles is defined by Equation [24] below.

$$HR_1 \oplus HR_2 = HR_3$$

$$HR_3.L = \{(HR_3.L^1, HR_3.L^2, \ldots, HR_3.L^n) \mid HR_3.L^i = \min(HR_1.L^i, HR_2.L^i)\}$$

$$HR_3.H = \{(HR_3.H^1, HR_3.H^2, \ldots, HR_3.H^n) \mid HR_3.H^i = \min(HR_1.H^i, HR_2.H^i)\}$$

$$i = 1, 2, \ldots n$$

$$HR_3.k = HR_1.k + HR_2.k \quad [24]$$

According to the Definition 8, it can be recognized that the merging operator $\oplus$ has a symmetric property. That is, $HR_1 \oplus HR_2 = HR_2 \oplus HR_1$ is constructed. Consider a case that the point P is merged to the hyper-rectangle $HR = <L, H, k>$. This merging process will probably cause changes in the volume, the edge and the number of points of the hyper-rectangle. The amount of change in each is an important factor for clustering, and volume and edge increments can be expressed as the following Equation [25].

$$\Delta\text{Vol}(HR, P) = \text{Vol}(HR \oplus HR(P)) - \text{Vol}(HR)$$

$$\Delta\text{Edge}(HR, P) = \text{Edge}(HR \oplus HR(P)) - \text{Edge}(HR) \quad [25]$$

In the present invention, two clustering factors to be considered for clustering MDSs are discussed, wherein the two clustering factors are geometric and semantic factors. The former is related to the geometric characteristics of hyper-cubes, While the latter is related to the semantic relationship between points in the hyper-cubes.

The geometric characteristics of the cluster significantly affect the search efficiency, such that the geometric characteristics must be considered importantly for clustering. It is obvious that a cluster with a large volume in the search space has the higher possibility to be accessed by a query than that of a small volume. However, the edge of the cluster must be also considered as an important factor in addition to the volume of the cluster. Further, specific means for solving the effect of the edge on the clustering will be described below.

Further, two consecutive points in a segment are closely related to each other semantically, such that the distance therebetween must be also considered as an important factor. If an arbitrary point is spatially far from the previous point in a sequence, it can be assumed that a new segment is started from the arbitrary point.

Figure 5:
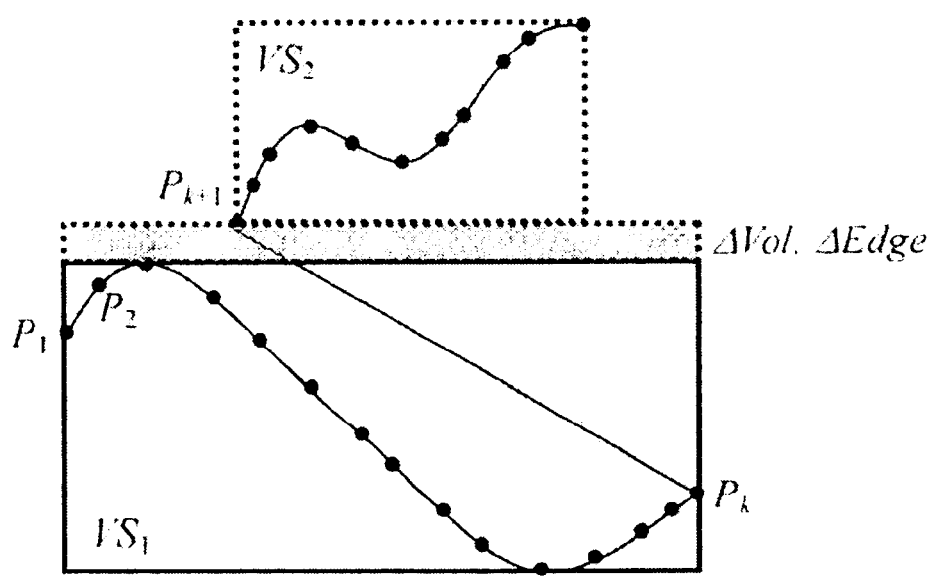
FIG. 5 is a graph showing a semantic factor among clustering factors of this invention.

FIG. 5 is a view showing the semantic factor of the clustering factors of this invention, and the semantic factor is described as follows.

Referring to FIG. 5, consider a problem for determining whether in an MDS composed of a series of points $P_j$ for j=1, 2, . . . , k, k+1, . . . , a point $P_{k+1}$ is to be merged into a segment $VS_1$ or a new segment is stared from the point $P_{k+1}$.

Assuming that in case the point $P_{k+1}$ is included in the segment $VS_1$, the increments of the volume and edge are respectively $\Delta Vol(VS_1, P_{k+1})$ and $\Delta Edge(VS_1, P_{k+1})$, these amounts are related to the shaded area in FIG. 5. If the volume and the edge are just considered as the clustering factors, it is highly possible that the point $P_{k+1}$ is included in the segment $VS_1$, because both $\Delta Vol$ and $\Delta Edge$ are relatively small.

However, because the point $P_{k+1}$ is spatially far from the previous point $P_k$, that is, two points are dissimilar semantically, it is preferable that a new segment $VS_2$ is started from the point $P_{k+1}$. This means that the distance between two consecutive points must be also considered as an important clustering factor.

After the multidimensional sequences are generated from data sources, such as video clips, each sequence is partitioned into segments. The segmentation is the process for generating each segment by continuously merging a point of the sequence into a current hyper-rectangle if the predefined criteria are satisfied. Assume that a point P is merged into the hyper-rectangle HR=<L, H, k> in the unit space $[0, 1]^n$. The segmentation is done in such a way such that if the merging of the point P into the hyper-rectangle HR satisfies certain given conditions, the point P is merged into the HR of the current segment, otherwise, a new segment is started from the point P. In the segmentation process, a merging object is a hyper-rectangle, while a merged object is always a point.

The segment is defined as the following Definition 9.

[Definition 9]

A segment VS containing k points in the temporal order, $P_j$ for j=1, 2, . . . , k, is defined as the following Equation [26].

$$VS=<sid,SP,HR> \quad [26]$$

Here, sid is the segment identification (id), and SP is the starting point of the segment VS.

In order to merge an arbitrary point into a specific segment during the segmentation process, predefined geometric and semantic criteria must be satisfied. Hereinafter, such criteria and proposed algorithms are described in detail.

4-1 Geometric Criterion

The geometric criterion is the geometric bounding condition with respect to the volume and edge of the segment. For the geometric bounding condition, the concept of a unit hyper-cube is first introduced.

Provided that a minimum hyper-rectangle containing all K points in the sequence S is $HR_s$, a unit hyper-cube uCube is defined as a cube occupied by a single point in the space $[0, 1]^n$ if all points in the sequence S are uniformly distributed over the minimum hyper-rectangle $HR_s$. If the side-length of the cube is e, the volume and the edge are expressed as the following Equation [27].

$$Vol(nCUBE) = e^n = \frac{Vol(HR_s)}{K} \quad [27]$$

$$Edge(uCUBE) = 2^{n-1} n \; e = 2^{n-1} n \sqrt[n]{\frac{Vol(HR_s)}{K}}$$

If all points of the sequence S are uniformly scattered into the space of $HR_s$, it can be recognized that one point is allocated to a unit hyper-cube uCube. In other words, it is intuitively seen that each point of S forms a hyper-rectangle having a unit hyper-cube shape. However, the uniform distribution assumed here is not likely to occur in reality. For example, frames in a video shot are very similar, and if each frame is represented by one point, these points are clustered together. The uniform distribution provides a geometric condition for determining whether or not the merging of two clusters is allowed.

In other words, the bounding thresholds with respect to the volume and the edge are given as the following Equation [28].

$$\tau_{vol}=Vol(uCUBE)=e^n$$

$$\tau_{edge}=Edge(uCUBE)=2^{n-1}n \; e \quad [28]$$

A geometric bounding condition proposed in the present invention on the basis of the above descriptions is represented as the following Definition 10.

[Definition 10]

If the point P is merged into the segment VS in the space $[0, 1]^n$, the geometric bounding condition is the condition to be satisfied so as to merge the point P into the segment VS and defined as the following Equation [29].

$$\Delta Vol(VS,P) \leq \tau_{vol}, \Delta Edge(VS,P) \leq \tau_{edge} \quad [29]$$

Meanwhile, the clustering that satisfies the geometric bounding condition guarantees better clustering quality than the case of the uniform distribution, with respect to VPP and EPP. The better clustering quality can be proven with a simple mathematical operation, however the operation is omitted for simplification of description.

4-2 Semantic Criterion

In order to determine whether or not a specific point is to be merged into a current segment, the distance between the specific point and its previous point in the sequence is examined. If the distance exceeds a predefined threshold, a new segment is started from the specific point. Consider an MDS having K points $P_j$ for j=1,2, . . . , K. A threshold $\tau_{dist}$ is the mean distance between all pairs of adjacent points in the sequence, and defined as the following Equation [30].

$$\tau_{dist} = \frac{1}{K-1} \sum_{1 \leq j \leq K-1} dist(P_j, P_{j+1}) \quad [30]$$

A semantic bounding condition based on the above descriptions is represented as the following Definition 11.

[Definition 11]

If a point $P_{k+1}$ is merged into a segment VS in the unit space $[0, 1]^n$, the semantic condition is the condition to be satisfied for merging the point $P_{k+1}$ into the segment VS and defined as the following Equation [31].

$$dist(P_k, P_{k+1}) \leq \tau_{dist} \quad [31]$$

If the condition is satisfied, the distance between any pair of two consecutive points in the segment is equal to or less than the mean distance between all pairs of consecutive points in the sequence. This means that consecutive points in a segment must have considerable similarity.

4-3 Segmentation Algorithm

The merging of any point into a segment is allowed only if the geometric and semantic bounding conditions are satisfied. Further, the input parameter minPts is used to decide outliers. If the number of points in the segment after the segmentation process is less than the parameter minPts, all points in the segment are considered as the outliers.

Figure 6:
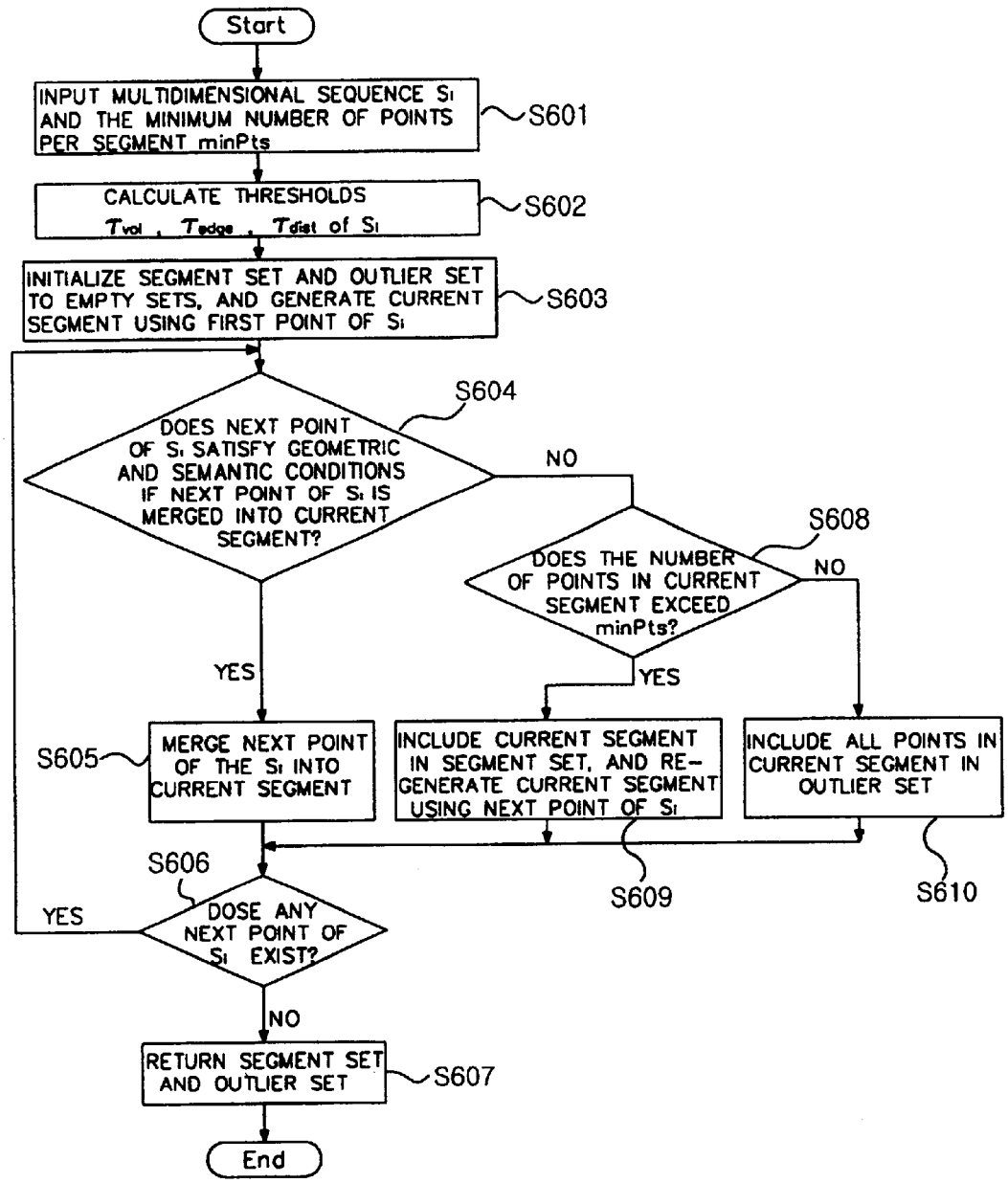
FIG. 6 is a flowchart of a sequence segmentation process according to a preferred embodiment of the present invention.

FIG. 6 is a flowchart of a sequence segmentation process according to a preferred embodiment of the present invention, and the sequence segmentation process is described in detail based on the above descriptions as follows.

First, a multidimensional sequence $S_i$ and the minimum number of points per segment minPts are inputted at step S601, and thresholds $\tau_{vol}$, $\tau_{edge}$, $\tau_{dist}$ for $S_i$ are calculated at step S602. Then, a set of segments and a set of outliers are initialized to empty sets, and a current segment is generated using a first point of $S_i$ at step S603. This generation algorithm has been described above in detail.

Then, if a next point of $S_i$ is merged into the current segment, it is determined whether the next point satisfies both the geometric and semantic bounding conditions at step S604.

If it is determined that both the conditions are satisfied according to the determined result at step S604, the next point of the $S_i$ is merged into the current segment at step S605, and then it is determined whether or not any next point of $S_i$ exists at step S606.

If it is determined that any next point exists at step S606, the process returns to the step S604. On the other hand, if there is not any next point, the segment set and the outlier set are returned and then the process ends at step S607.

On the other hand, if the next point does not satisfy any one of the geometric and semantic bounding conditions according to the determined result at step S604, the number of points in the current segment exceeds the parameter minPts at step S608.

If the number of points in the current segment exceeds the minPts, the current segment is included in the segment set, and a new current segment is re-generated using the next point of the $S_i$ at step S609. After the step S609 is performed, the step S606 is performed.

Further, if the number of points in the current segment does not exceed the minPts at step S608, all points in the current segment are included in the outlier set at step S610, and then the step S606 is performed.

5. Similarity Search Processing

In this chapter, the overall process proposed in the present invention is summarized.

Before a query is processed, pre-processing is executed to extract feature vectors from row materials such as video streams or images and to construct an index for later searching. After the index is constructed, the similarity search is performed to select candidate sequences from a database and to detect the solution interval of each selected candidate sequence.

5-1 Pre-Processing

Generation of multidimensional sequences (first step): The row materials such as videos or images are parsed to extract the feature vectors. Each vector is represented by a multidimensional point in the hyper data space. If the vector is of high dimension, a variety of dimension reduction techniques such as the Discrete Fourier Transform (DFT) or Wavelets can be applied to avoid the dimensionality curse problem. A series of points constitutes a multidimensional sequence.

Index construction (second step): Each multidimensional sequence is partitioned into subsequences by using the partitioning algorithms (segmentation algorithm) as described above. Each subsequence is enclosed by an MBR. Every MBR is indexed and stored in a database using any R-Tree variant.

5-2 Post-Processing (Similarity Search Algorithm)

After the index is constructed, the similarity search is performed with respect to a given query sequence.

Figure 7:
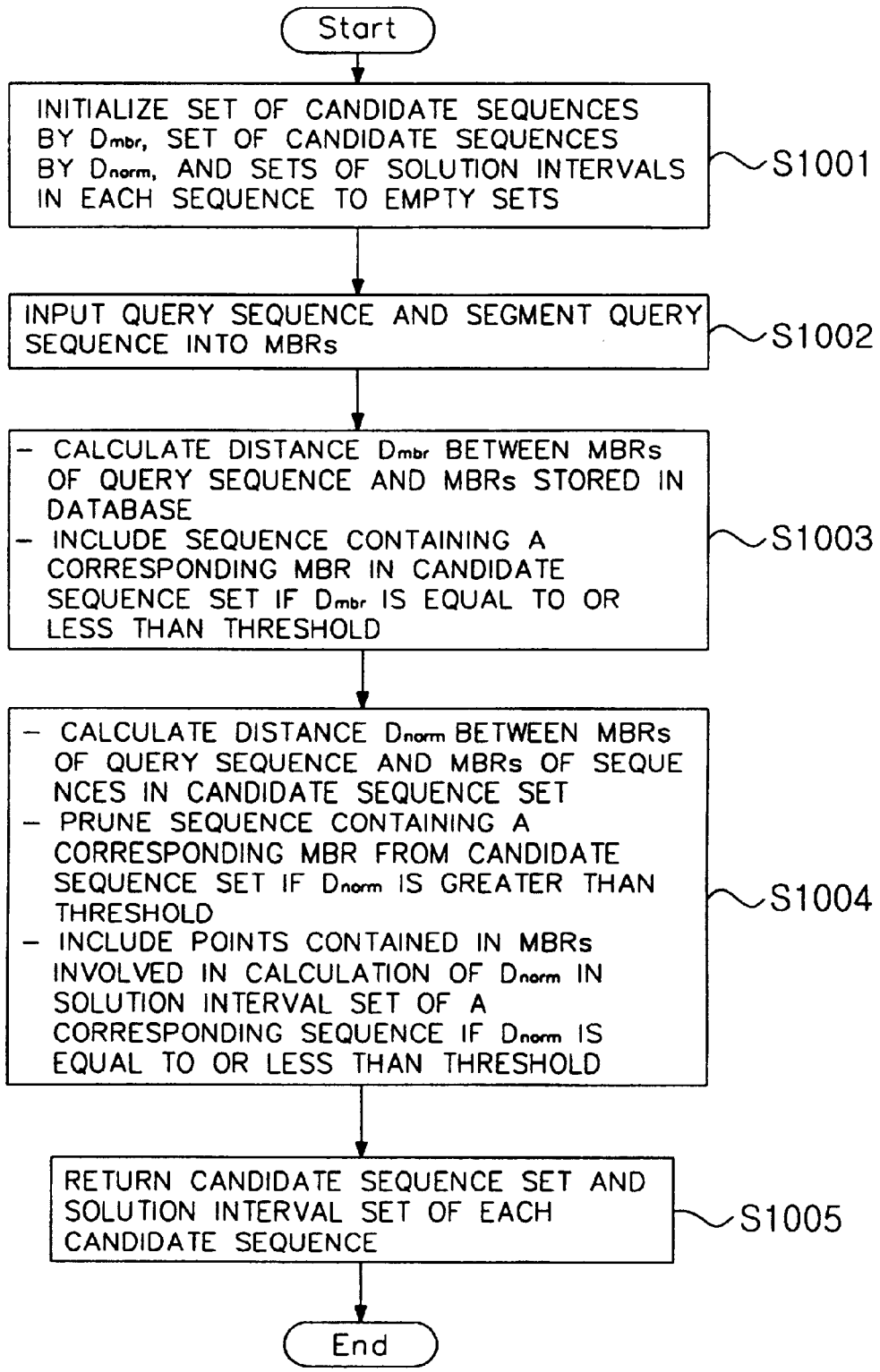
FIG. 7 is a flowchart of a similarity search process according to a preferred embodiment of this invention.

FIG. 7 is a flowchart of a similarity search process according to a preferred embodiment of this invention, and the similarity search process is described in detail as follows.

First, a set of candidate sequences by $D_{mbr}$, a set of candidate sequences by $D_{norm}$ and sets of solution intervals of sequences are initialized to empty sets at step S1001. Then, a query sequence is inputted and segmented into MBRs at step S1002. In this case, a clustering algorithm can be also performed for efficiency of searching.

Then, the distance $D_{mbr}$ between each MBR of the query sequence and each MBR stored in the database 140 of FIG. 1 is calculated, and if $D_{mbr}$ is equal to or less than a threshold, a sequence containing a corresponding MBR is included in the candidate sequence set at step S1003.

Then, the distance $D_{norm}$ between each MBR of the query sequence and each MBR of sequences in the candidate sequence set is calculated, and if $D_{norm}$ is greater than a threshold, a sequence containing a corresponding MBR is pruned from the candidate sequence set, while if $D_{norm}$ is equal to or less than the threshold, points contained in MBRs involved in the calculation of $D_{norm}$ are included in the solution interval set of a corresponding sequence at step S1004.

Then, the candidate sequence set and each solution interval set of each candidate sequence are returned and the process is completed at step S1005.

On the other hand, the similarity search process proposed in the present invention can be realized by using conventional partitioning algorithms not using the sequence segmentation method proposed in the present invention. For this realization, a partitioning algorithm proposed in a thesis entitled "Fast Subsequence Matching in Time-Series Databases" by "C. Faloutos, M. Ranganathan, Y. Manolopoulos" and published in "Proceedings of ACM SIGMOD Int'l Conference on Management of Data" is used by slightly modifying its cost function.

This algorithm uses a cost function which estimates the number of disc accesses for an MBR. In this algorithm, the marginal cost (MCOST) of a point in an MBR is defined as the average number of disc accesses (DA) divided by the number of points in the MBR.

If the MCOST is increased for each consecutive point of a sequence, another subsequence is started from the point, otherwise, the point is included in the current subsequence, such that points in the sequence are grouped into subsequences. Because the similarity search method proposed in the present invention is based on the MBRs of both a query sequence and a data sequence, the calculation of MCOST is slightly modified as follows so as to reflect the MBRs of the query sequence in addition to the MBRs of the data sequence when the MCOST is calculated.

Consider a case that an n-dimensional subsequence having m points is enclosed by an MBR having sides L=($L_1$, $L_2$, ..., $L_n$). In this case, if a query MBR has sides Q=($Q_1$, $Q_2$, ..., $Q_n$), and a given threshold is $\epsilon$, the MCOST of each point in the MBR is expressed by the following Equation [32].

$$MCOST = \frac{DA}{m} = \frac{\prod_{k=1}^{n}(L_k + Q_k + \varepsilon)}{m} \qquad [32]$$

An appropriate value for $Q_k+\epsilon$ can be selected by evaluating various combinations of $Q_k$ and $\epsilon$. In the present invention, 0.3 is used as the value for $Q_k+\epsilon$, because 0.3 demonstrates the best partitioning by extensive experiments.

6. Experiments 6-1 Experimental Environments

In order to measure the effectiveness and performance of the proposed present invention, comprehensive experiments were performed with respect to synthetic data sequences generated by using a Fractal function, and real video data.

The video data were extracted from television news, dramas and movie films. The experiments focused on showing the efficiency of the method to prune a database of irrelevant sequences and to find the solution interval. This experimental system was written in Microsoft VC++ under Windows NT environment on the HP Net server.

6-2 Generation of Experimental Data

Figure 8:
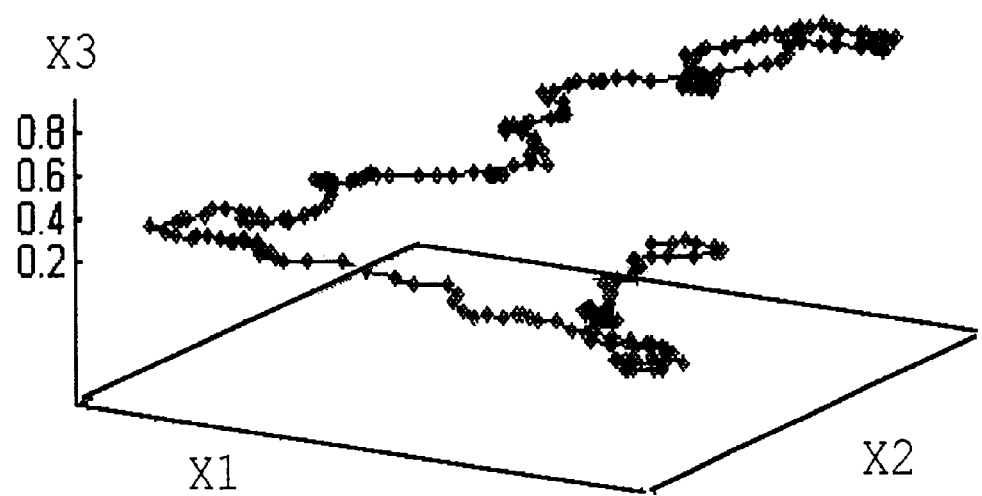
FIG. 8 is a graph showing an example of a synthetic sequence generated using a fractal function.
Figure 9:
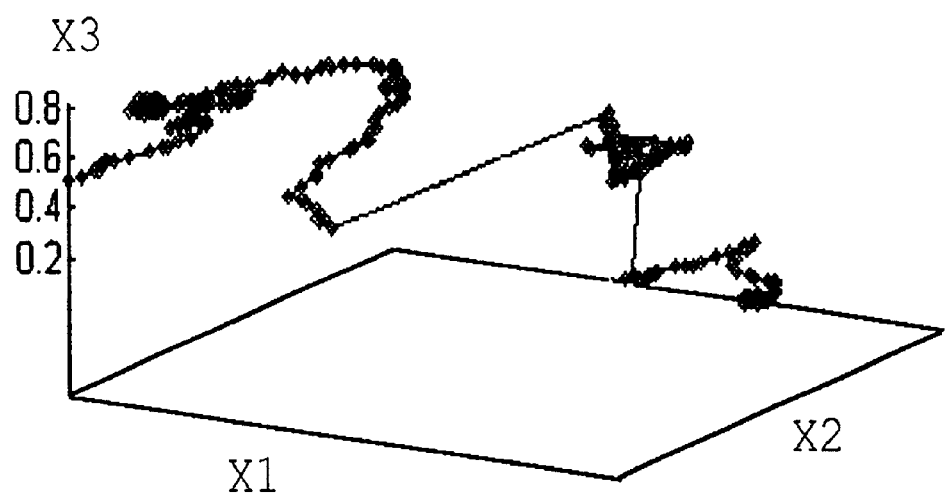
FIG. 9 is a graph showing an example of a sequence generated from real video streams.

FIG. 8 is a graph showing an example of a synthetic sequence generated using a Fractal function, FIG. 9 is a graph showing an example of a sequence generated from real video streams, and these generated sequences are described in detail.

The data used in the experiments were synthetic multidimensional data sequences and real video stream. For convenience of experiments, three-dimensional data are used as all data; however, the present invention is not limited by the dimensionality of data and any dimensional data sequences can be used. The synthetic data sequences were obtained using the Fractal function as follows.

(a) Two three-dimensional initial points, $P_{start}$ for the beginning point of a sequence and $P_{end}$ for the end point are selected randomly in the three-dimensional data space $[0, 1]^3$.

(b) A middle point $P_{mid}$ of $P_{start}$ and $P_{end}$ is calculated by the following Equation [33].

$$P_{mid}=(P_{\cdot t}+P_{end})/2+dev*random( \qquad [33]$$

where dev is selected to control the amplitude of a sequence in the range $[0, 1]$, and random( ) is the function for generating a random real number from 0 to 1.

(c) After $P_{mid}$ is obtained, two subsequences $(P_{start}, P_{mid})$ and $(P_{mid}, P_{end})$ are generated around the point $P_{mid}$. The step (b) is recursively repeated for each subsequence using a new dev obtained by the following Equation [34].

$$dev=scale*dev \qquad [34]$$

where scale is a real number in the range $[0, 1]$. Because the two subsequences are shorter than their parent, a lower dev value is used for the successive recursive call.

The multidimensional data sequences are generated from the video data streams by extracting color features from each frame. That is, each frame is mapped into a three-dimensional point in the data space.

In other words, the following Table 1 summarizes parameters used in the experiments.

TABLE 1

Parameters used in experiments

| | Synthetic data | Video data |
|---|---|---|
| Number of data sequences | 1600 | 1408 |
| Length of data sequences | Arbitrary (number of points: 56 to 512) | Arbitrary (number of points: 56 to 512) |
| Range of threshold value ($\epsilon$) | 0.05 to 0.5 | 0.05 to 0.5 |
| Number of query sequences for each $\epsilon$ | 20 | 20 |

6-3 Experimental Results

The range search is a method for finding similar sequences in a database with respect to a given query sequence within a specific threshold. In the experiments, test cases composed of various combinations of parameters were executed. The range of 0.05 to 0.5 was selected as the threshold range, which means that a query diameter is between 0.1 and 1.0. This range provides enough coverage for the low and high electivity, because the diagonal length in the three-dimensional cube $[0,1]^3$ (that is, the maximum possible length in the cube) is $\sqrt{3}$. For each test with each threshold value, twenty queries randomly selected were issued, and the average of query results was obtained. Several aspects of the proposed method are described as follows.

6-3-1 Pruning Efficiency of Sequences Irrelevant to Query

The pruning efficiency of sequences irrelevant to the query by $D_{mbr}$ and $D_{norm}$ to select candidate sequences from a database was examined by varying the threshold value. Here, a pruning rate (PR) was used to measure the pruning efficiency, and is defined as the following Equation [35].

$$PR = \frac{|\text{sequences actually pruned}|}{|\text{sequences to be pruned}|} \qquad [35]$$

$$= \frac{|\text{total sequences}| - |\text{retrieved sequences}|}{|\text{total sequences}| - |\text{relevant sequences}|}$$

where $|s|$ is the number of elements in a set S.

Figure 10:
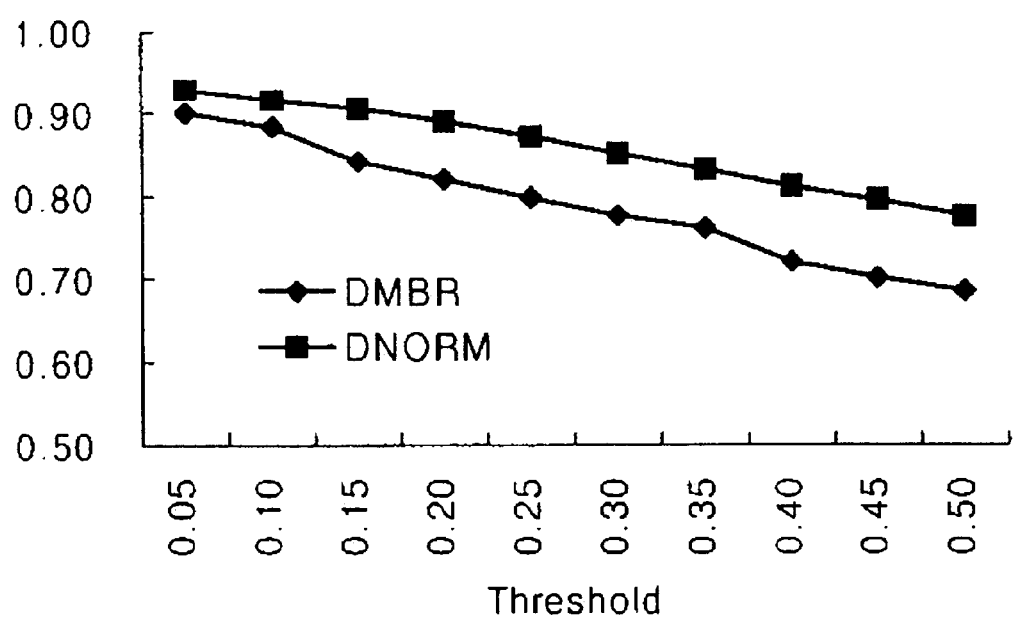
FIG. 10 is a graph showing pruning rates by $D_{mbr}$ and $D_{norm}$ for synthetic data.
Figure 11:
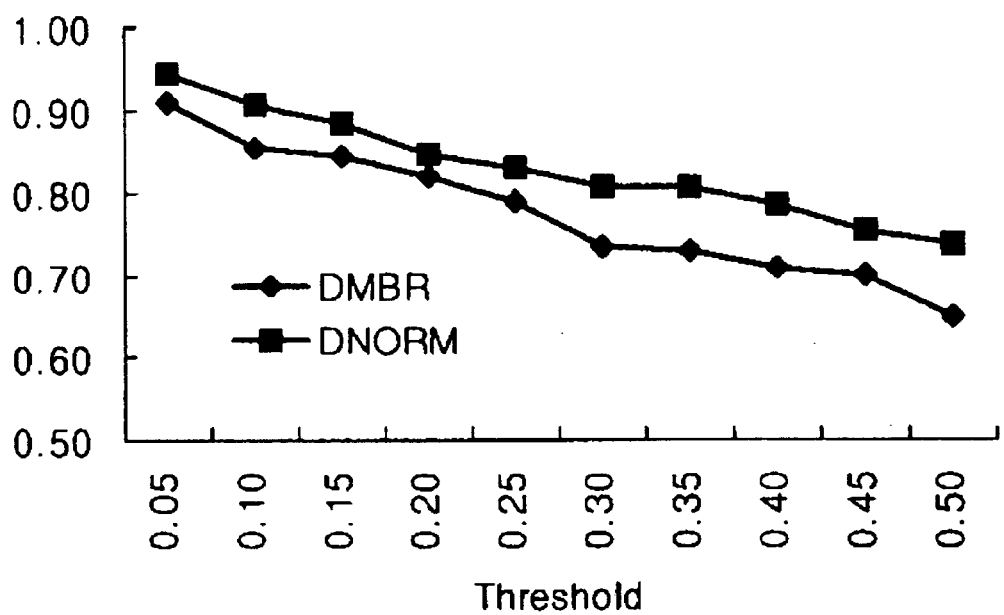
FIG. 11 is a graph showing pruning rates by $D_{mbr}$ and $D_{norm}$ for real video data.

FIG. 10 is a graph showing the pruning rates of $D_{mbr}$ and $D_{norm}$ for synthetic data, and FIG. 11 is a graph showing pruning rates by $D_{mbr}$ and $D_{norm}$ for real video data.

FIGS. 10 and 11 show that the pruning rate of $D_{mbr}$ is 70 to 90% for the synthetic data and 65 to 91% for the video data for the range of a threshold value, 0.05 to 0.5. Further, referring to drawings, the pruning rate of the $D_{norm}$ is 76–93% for the synthetic data and 73–94% for the video data, which shows that the pruning rate of $D_{norm}$ is constantly 3–10% better than that of the $D_{mbr}$ in the whole range of the threshold.

These experimental results further show that, as the given threshold value increases, the pruning rate decreases. The reason is that the search range increases for a larger threshold, such that the number of retrieved sequences for a larger threshold increases more rapidly than the number of relevant sequences.

6-3-2 Pruning Efficiency for Finding Subsequences

The pruning efficiency of the solution interval estimated by the method proposed in the present invention was measured. First, there are provided measures for estimating the pruning efficiency of the selected solution interval.

Assume that $P_{total}$ is a set of total points in a sequence, $P_{scan}$ is a set of points in a subsequence obtained by using a sequential scan, and $P_{norm}$ is a set of points in the solution interval estimated by using the normalized distance $D_{norm}$. Then, the pruning efficiency $PR_{SI}$ for finding subsequences by $D_{norm}$ is defined as Equation [36] below.

$$PR_{SI} = \frac{|\text{points actually pruned}|}{|\text{points to be pruned}|} = \frac{|P_{total}| - |P_{norm}|}{|P_{total}| - |P_{scan}|} \qquad [36]$$

Because the solution interval calculated by using the normalized distance $D_{norm}$ does not guarantee the correctness, it is required to examine the recall of the estimated solution interval. This recall is defined as the following Equation [37].

$$\text{Recall} = \frac{|P_{scan} \cap p_{norm}|}{|P_{scan}|} \quad [37]$$

Figure 12:
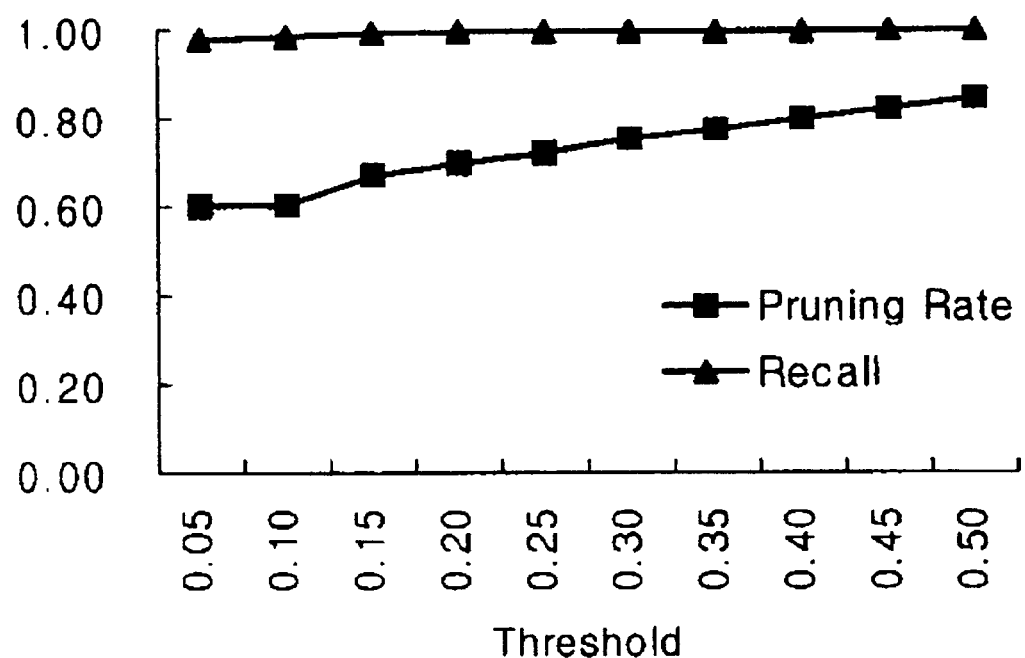
FIG. 12 is a graph showing the result on the pruning efficiency by $D_{norm}$ of the synthetic data and the recall of an estimated solution interval.
Figure 13:
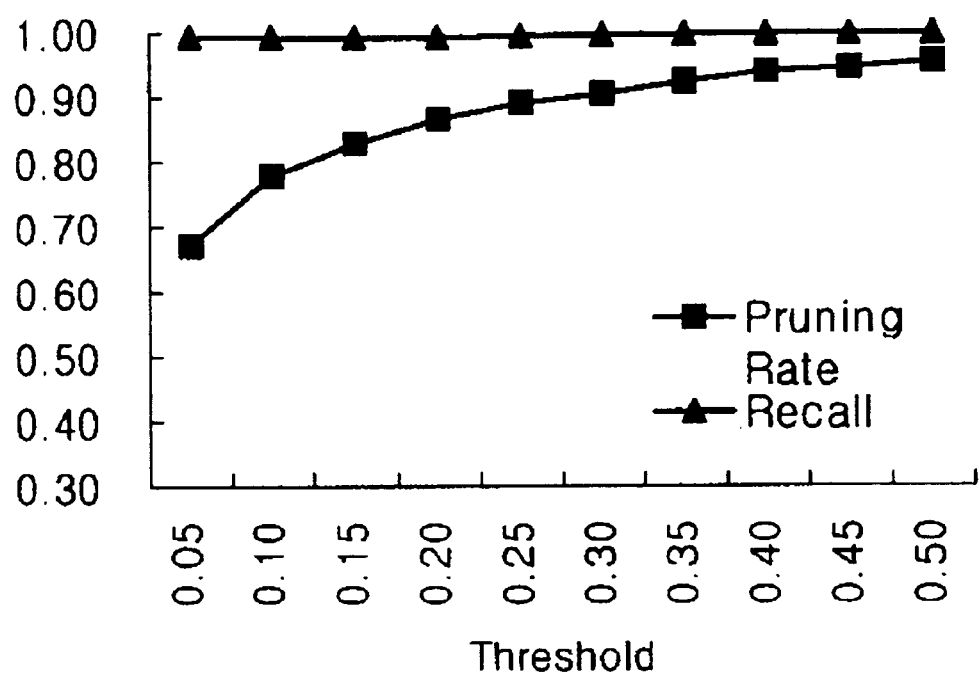
FIG. 13 is a graph showing the result on the pruning efficiency by $D_{norm}$ of the real video data and the recall of an estimated solution interval.

FIG. 12 is a graph showing the result on the pruning efficiency for the synthetic data by $D_{norm}$ and the recall of the estimated solution interval, and FIG. 13 is a graph showing the result on the pruning efficiency for the real video data by $D_{norm}$ and the recall of the estimated solution interval.

As shown in FIGS. 12 and 13, the recall vales for both the synthetic data and the real video data are 98 to 100%, and approach 1.0 very closely. This means that the method proposed in the present invention almost satisfies "No False Dismissal".

In this case, the pruning rate $PR_{SI}$ by $D_{norm}$ is around 60 to 80% on the synthetic data, while it is around 67 to 94% on the real video data for the thresholds with the range 0.05 to 0.5. This shows that the pruning rate of the video data is better than that of the synthetic data. This is because the video data are well clustered compared with the synthetic data.

Generally, it is known that frames in the same shot of a video stream have very similar feature values.

6-3-3 Response Time

The response times of the method proposed in the present invention and the sequential scan method were compared to each other. In the experiments, twenty random queries with the same threshold over the synthetic data and the real data were executed to find data sequences similar to a given query sequence and solution intervals with the selected sequences by using the distances $D_{mbr}$ and $D_{norm}$. Further, a response time is calculated by averaging the results of the twenty queries. The response time ratio of the sequential scan method to the proposed method is calculated by the following Equation [38].

$$\text{response time ratio} = \frac{\text{response time for searching by the sequential scan}}{\text{response time for searching by the proposed algorithm}} \quad [38]$$

where the denominator of the Equation [38] is the total elapsed time for the search by both the $D_{mbr}$ and $D_{norm}$.

Figure 14:
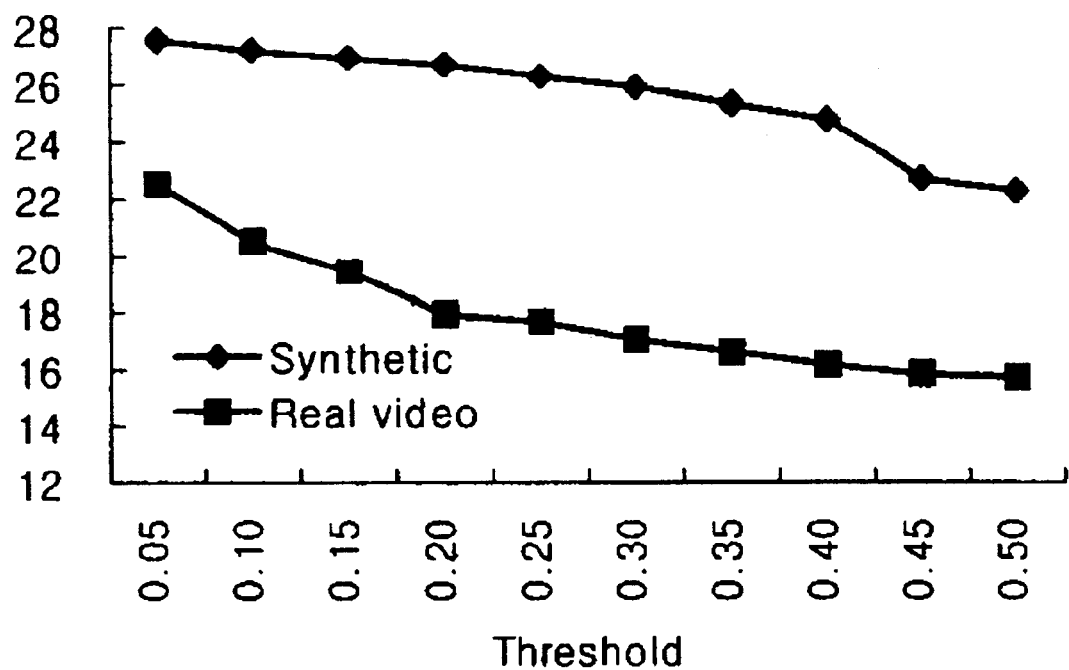
FIG. 14 is a graph showing the average response time ratio of the method proposed in the present invention compared to the sequential scan method.

FIG. 14 is a graph showing the average response time ratio of the method proposed in the present invention compared to the sequential scan method. Referring to FIG. 14, it can be seen that the proposed method performs 22 to 28 times better for the synthetic data, and 16 to 23 times better for the real video data than the sequential scan method.

As described above, the advantages obtained by using methods proposed in the present invention are described as follows.

The present invention deals with a problem for retrieving similar sequences from a large database having multidimensional data sequences such as video streams. Then, in order to solve the problem, the distance between two multidimensional sequences is defined, and two lower bounding distance functions $D_{mbr}$ and $D_{norm}$ are introduced. Based on the distance functions, the present invention proposes an algorithm for pruning the database of sequences irrelevant to a given query sequence and finding the solution interval of selected sequences. Although one of potential applications emphasized in the present invention is the similarity search for large video data, the method proposed in the present invention can be applied to various application areas. The desirable effects of the present invention are summarized as follows.

First, the search algorithm is based on MBRS, not each point in sequences. Therefore, the search algorithm of the present invention is fast and needs small storage overhead, compared with the sequential scan of each point in the sequence.

Second, the present invention can handle sophisticated search problems for finding subsequences of a selected sequence, as well as typical similarity search for selecting just candidate sequences from the database.

Third, the present invention does not restrict the length of sequences. The query sequences and data sequences are of arbitrary length, and especially, even if a given query sequence is longer than a data sequence, the similarity search can be performed.

Fourth, the similarity search method for multidimensional sequences of the present invention can be grafted together with any conventional multidimensional access method (that is, R*-Tree or X-Tree), thus guaranteeing the flexibility of the present invention.

In other words, the present invention has the highest advantage in that it extends the typical similarity search method on one-dimensional time-series data to support multidimensional data sequences which are more generalized format of sequences. Further, the present invention performs experiments with synthetic data and real video data to examine the pruning efficiency and performance of this invention compared with the sequential scan method. Here, the method of the present invention shows a remarkable efficiency to prune sequences irrelevant to a given query sequence and to find the solution interval of selected candidate sequences. Moreover, the present invention has a response time 16 to 28 times faster than that of the sequential scan method.

On the other hand, the present invention has additional important effects as follows.

The present invention, which is related to the segmentation of multidimensional data sequences, first proposes clustering factors considering geometric and semantic characteristics of segments to handle such segmentation. Then, the measures for evaluating the clustering quality are defined. Based on these clustering factors and measures, the present invention proposes an effective clustering method having the following desirable properties.

First, the present invention can maintain and manage the temporal and semantic relationship between elements in a cluster.

Second, the present invention can generate dense clusters which satisfy the predefined criteria, with respect to the volume and edge.

Third, the present invention can identify outliers properly and can deal with the outliers differently from clusters in order to increase efficiency of later retrieval operations.

Fourth, the present invention is designed such that most input parameters required for clustering are determined using the characteristics of a sequence, not supplied by the user.

Consequently, the present invention is advantageous in that similarity search method for multidimensional data sequences can be more efficiently performed based on the segments.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for hyper-rectangle based multidimensional data similarity searches, the multidimensional data being representable by a multidimensional data sequence, comprising:

MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;

first sequence pruning means for pruning irrelevant data sequences using a distance $D_{mbr}$ between MBRs extracted from an inputted query sequence and the MBR sets stored in the database in a multidimensional Euclidean space;

second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points in MBRs involved in a calculation of the distance $D_{norm}$ from each sequence obtained using the distance $D_{norm}$.

2. The similarity search apparatus according to claim 1, wherein the distance $D_{mbr}$ is the minimum distance between two hyper-rectangles.

3. The similarity search apparatus according to claim 1, wherein the distance $D_{norm}$ is determined using:

(a) the number of points contained in each MBR;

(b) distance $D_{mbr}$ between the query MBR and a target MBR in the data sequence; and (c) distance $D_{mbr}$ between the query MBR and an MBR adjacent to the target MBR in the data sequence.

4. An apparatus for hyper-rectangle based multidimensional data similarity searches, comprising:

MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;

first sequence pruning means for pruning irrelevant data sequences using a distance $D_{mbr}$ between MBRs extracted from an inputted query sequence and the MBR sets stored in the database in a multidimensional Euclidean space;

second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points in MBRs involved in a calculation of the distance $D_{norm}$ from each sequence obtained using the distance $D_{norm}$;

wherein the MBR generation means includes:

threshold calculation means for inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle containing all points in the sequence $S_i$, segment generation means for initializing a segment set and an outlier set to empty sets and generating a current segment using a first point of the sequence $S_i$, geometric condition determination means for determining whether a next point of the sequence $S_i$ satisfies a geometric condition using the bounding threshold values for the volume and the edge, segment merging means for merging the next point of the sequence $S_i$ into the current segment if geometric condition is satisfied, and segment updating means for including the current segment in the segment set and re-generating a new current segment using the next point of the sequence $S_i$, if the geometric condition is not satisfied and the number of points contained in the current segment exceeds the minimum number of points per segment minPts.

5. The similarity search apparatus according to claim 4, wherein the geometric condition determination means determines that the geometric condition is satisfied if the following Equation [1] is satisfied:

$$\Delta\text{Vol}(VS,P) \leq \tau_{vol}, \Delta\text{Edge}(VS,P) \leq \tau_{edge} \quad [1]$$

where $\Delta\text{Vol}(VS,P)$ is the difference between volumes of the current segment VS and a segment generated by merging the next point of the sequence $S_i$ into the current segment VS, $\Delta\text{Edge}(VS,P)$ is the difference between edge lengths of the current segment VS and the segment generated by merging the next point of the sequence $S_i$ into the current segment VS, $\tau_{vol}$ is the bounding threshold value for the volume, and $\tau_{edge}$ is the bounding threshold value for the edge.

6. An apparatus for hyper-rectangle based multidimensional data similarity searches, comprising:

MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;

first sequence pruning means for pruning irrelevant data sequences using a distance $D_{mbr}$ between MBRs extracted from an inputted query sequence and the MBR sets stored in the database in a multidimensional Euclidean space;

second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points in MBRs involved in a calculation of the distance $D_{norm}$ from each sequence obtained using the distance $D_{norm}$;

wherein the MBR generation means includes:
threshold calculation means for inputting a multidimensional sequence $S_i$ and the minimum number of points per segment minPts, and calculating bounding threshold values for a volume and a semantic factor using a unit hyper-cube occupied by a single point in n-dimensional unit space, if points are uniformly distributed in a hyper-rectangle which is a minimum bounding rectangle containing all points in the sequence $S_i$, segment generation means for initializing a segment set and an outlier set to empty sets and generating a current segment using a first point of the sequence $S_i$, geometric and semantic condition determination means for determining whether a next point of the sequence $S_i$ satisfies geometric and semantic conditions using the bounding threshold values for the volume and the semantic factor, segment merging means for merging the next point of the sequence $S_i$ into the current segment if the geometric and semantic conditions are satisfied, and segment updating means for including the current segment in the segment set and re-generating a new current segment using the next point of the sequence $S_i$, if the geometric and semantic conditions are not satisfied and the number of points contained in the current segment exceeds the minimum number of points per segment minPts.

7. The similarity search apparatus according to claim 6, wherein the geometric and semantic condition determination means determines that the geometric and semantic conditions are satisfied if the following Equation [2] is satisfied:

$$\Delta\text{Vol}(VS,P) \leq \tau_{vol} \cdot \text{dist}(P_k, P_{k+1}) \leq \tau_{dist} \qquad [2]$$

where $\Delta\text{Vol}(VS,P)$ is the difference between volumes of the current segment VS and a segment generated by merging the next point of the sequence $S_i$ into the current segment VS, dist $(P_k, P_{k+1})$ is the distance between two adjacent points in the segment, $\tau_{vol}$ is the bounding threshold value for the volume, and $\tau_{dist}$ is the bounding threshold value for the semantic factor.

8. An apparatus for hyper-rectangle based multidimensional data similarity searches, comprising:
MBR generation means for segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;

first sequence pruning means for pruning irrelevant data sequences using a distance $D_{mbr}$ between MBRs extracted from an inputted query sequence and the MBR sets stored in the database in a multidimensional Euclidean space;

second sequence pruning means for pruning irrelevant data sequences using a normalized distance $D_{norm}$ between MBRs extracted from the query sequence and the MBR sets of data sequences remaining after the data sequences are pruned by the first sequence pruning means in a multidimensional Euclidean space; and subsequence finding means for finding subsequences similar to the given query sequence by obtaining sets of points in MBRs involved in a calculation of the distance $D_{norm}$ from each sequence obtained using the distance $D_{norm}$;

wherein the MBR generation means includes:
threshold calculation means for inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle containing all points in the sequence $S_i$, segment generation means for initializing a segment set and an outlier set to empty sets and generating a current segment using a first point of the sequence $S_i$, geometric and semantic condition determination means for determining whether a next point of the sequence $S_i$ satisfies geometric and semantic conditions using the bounding threshold values for the volume, the edge and the semantic factor, segment merging means for merging the next point of the sequence $S_i$ into the current segment if the geometric and semantic conditions are satisfied, and segment updating means for including the current segment in the segment set and re-generating a new current segment using the next point of the sequence $S_i$, if the geometric and semantic conditions are not satisfied and the number of points contained in the current segment exceeds the minimum number of points per segment minPts.

9. The similarity search apparatus according to claim 8, wherein the geometric and semantic condition determination means determines that the geometric and semantic conditions are satisfied if the following Equation [3] is satisfied:

$$\Delta\text{Vol}(VS,P) \leq \tau_{vol} \cdot \Delta\text{Edge}(VS,P) \leq \tau_{edge} \cdot \text{dist}(P_k, P_{k+1}) \leq \tau_{dist} \qquad [3]$$

where $\Delta\text{Vol}(VS,P)$ is the difference between volumes of the current segment VS and a segment generated by merging the next point of the sequence $S_i$ into the current segment VS, $\Delta\text{Edge}(VS,P)$ is the difference between edge lengths of the current segment VS and the segment generated by merging the next point of the sequence $S_i$ into the current segment VS, dist $(P_k, P_{k+1})$ is the distance between two adjacent points in the segment, $\tau_{vol}$ is the bounding threshold value for the volume, $\tau_{edge}$ is the bounding threshold value for the edge, and $\tau_{dist}$ is the bounding threshold value for the semantic factor.

10. A method for a hyper-rectangle based multidimensional data similarity searches, the multidimensional data being representable by a multidimensional data sequence, comprising the steps of:

segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;

pruning irrelevant data sequences using a distance $D_{mbr}$ between MBRs extracted from an inputted query sequence and the MBR sets stored in the database in a multidimensional Euclidean space;

pruning irrelevant data sequences using a normalized distance $D_{norm}$ between MBRs extracted from the query sequence and the MBR sets of data sequences remaining after the data sequences are pruned in a multidimensional Euclidean space; and finding subsequences similar to the given query sequence by obtaining sets of points contained in MBRs involved in a calculation of the distance $D_{norm}$ from each sequence obtained using the distance $D_{norm}$.

11. The similarity search method according to claim 10, wherein the distance $D_{mbr}$ is the minimum distance between two hyper-rectangles.

12. The similarity search method according to claim 10, wherein the distance $D_{norm}$ is determined using:
   (a) the number of points contained in each MBR;
   (b) distance $D_{mbr}$ between the query MBR and a target MBR in the data sequence; and
   (c) distance $D_{mbr}$ between the query MBR and an MBR adjacent to the target MBR in the data sequence.

13. A method for a hyper-rectangle based multidimensional data similarity searches, comprising the steps of:
   segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;
   pruning irrelevant data sequences using a distance $D_{mbr}$ between MBRs extracted from an inputted query sequence and the MBR sets stored in the database in a multidimensional Euclidean space;
   pruning irrelevant data sequences using a normalized distance $D_{norm}$ between MBRs extracted from the query sequence and the MBR sets of data sequences remaining after the data sequences are pruned in a multidimensional Euclidean space; and
   finding subsequences similar to the given query sequence by obtaining sets of points contained in MBRs involved in a calculation of the distance $D_{norm}$ from each sequence obtained using the distance $D_{norm}$;
   wherein the MBR generation step includes the steps of:
   inputting a multidimensional sequence $S_i$ and the minimum number of points per segment minPts, and calculating bounding threshold values for a volume and an edge using a unit hyper-cube occupied by a single point in n-dimensional unit space, if points are uniformly distributed in a hyper-rectangle which is a minimum bounding rectangle containing all points in the sequence $S_i$,
   initializing a segment set and an outlier set to empty sets and generating a current segment using a first point of the sequence $S_i$,
   determining whether a next point of the sequence $S_i$ satisfies a geometric condition using the bounding threshold values for the volume and the edge,
   merging the next point of the sequence $S_i$ into the current segment if the geometric condition is satisfied, and
   including the current segment in the segment set and updating the segment set by re-generating a new current segment using the next point of the sequence $S_i$, if the geometric condition is not satisfied and the number of points contained in the current segment exceeds the minimum number of points per segment minPts.

14. The similarity search method according to claim 13, wherein at the geometric condition determination step, it is determined that the geometric condition is satisfied if the following Equation [4] is satisfied:

$$\Delta\mathrm{Vol}(VS,P) \leq \tau_{vol}, \Delta\mathrm{Edge}(VS,P) \leq \tau_{edge} \quad [4]$$

where $\Delta\mathrm{Vol}(VS,P)$ is the difference between volumes of the current segment VS and a segment generated by merging the next point of the sequence $S_i$ into the current segment VS, $\Delta\mathrm{Edge}(VS,P)$ is the difference between edge lengths of the current segment VS and the segment generated by merging the next point of the sequence $S_i$ into the current segment VS, $\tau_{vol}$ is the bounding threshold value for the volume and $\tau_{edge}$ is the bounding threshold value for the edge.

15. A method for a hyper-rectangle based multidimensional data similarity searches, comprising the steps of:
   segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;
   pruning irrelevant data sequences using a distance $D_{mbr}$ between MBRs extracted from an inputted query sequence and the MBR sets stored in the database in a multidimensional Euclidean space;
   pruning irrelevant data sequences using a normalized distance $D_{norm}$ between MBRs extracted from the query sequence and the MBR sets of data sequences remaining after the data sequences are pruned in a multidimensional Euclidean space; and
   finding subsequences similar to the given query sequence by obtaining sets of points contained in MBRs involved in a calculation of the distance $D_{norm}$ from each sequence obtained using the distance $D_{norm}$;
   wherein the MBR generation step includes the steps of:
   inputting a multidimensional sequence $S_i$ and the minimum number of points per segment minPts and calculating bounding threshold values for a volume and a semantic factor using a unit hyper-cube occupied by a single point in n-dimensional unit space, if points are uniformly distributed in a hyper-rectangle which is a minimum bounding rectangle containing all points in the sequence $S_i$,
   initializing a segment set and an outlier set to empty sets and generating a current segment using a first point of the sequence $S_i$,
   determining whether a next point of the sequence $S_i$ satisfies geometric and semantic conditions using the bounding threshold values for the volume and the semantic factor,
   merging the next point of the sequence $S_i$ into the current segment if the geometric and semantic conditions are satisfied, and
   including the current segment in the segment set and updating the segment set by re-generating a new current segment using the next point of the sequence $S_i$, if the geometric and semantic conditions are not satisfied and the number of points contained in the current segment exceeds the minimum number of points per segment minPts.

16. The similarity search method according to claim 15, wherein at the geometric and semantic condition determination step, it is determined that the geometric and semantic conditions are satisfied if the following Equation [5] is satisfied:

$$\Delta\mathrm{Vol}(VS,P) \leq \tau_{vol}, \mathrm{dist}(P_k,P_{k+1}) \leq \tau_{dist} \quad [5]$$

where $\Delta\mathrm{Vol}(VS,P)$ is the difference between volumes of the current segment VS and a segment generated by merging the next point of the sequence $S_i$ into the current segment VS, dist ($P_k$, $P_{k+1}$) is the distance between two adjacent points in the segment, $\tau_{vol}$ is the bounding threshold value for the volume, and $\tau_{dist}$ is the bounding threshold value for the semantic factor.

17. A method for a hyper-rectangle based multidimensional data similarity searches, comprising the steps of:

segmenting a multidimensional data sequence to be partitioned into subsequences, and representing each subsequence by each Minimum Bounding Rectangle (MBR), such that sets of MBRs are generated from the multidimensional data sequence, and the MBR sets are stored in a database;

pruning irrelevant data sequences using a distance $D_{mbr}$ between MBRs extracted from an inputted query sequence and the MBR sets stored in the database in a multidimensional Euclidean space;

pruning irrelevant data sequences using a normalized distance $D_{norm}$ between MBRs extracted from the query sequence and the MBR sets of data sequences remaining after the data sequences are pruned in a multidimensional Euclidean space; and finding subsequences similar to the given query sequence by obtaining sets of points contained in MBRs involved in a calculation of the distance $D_{norm}$ from each sequence obtained using the distance $D_{norm}$;

wherein the MBR generation step includes the steps of:

inputting a multidimensional sequence $S_i$ and the minimum number of points per segment minPts, and calculating bounding threshold values for a volume, an edge and a semantic factor using a unit hyper-cube occupied by a single point in n-dimensional unit space, if points are uniformly distributed in a hyper-rectangle which is a minimum bounding rectangle containing all points in the sequence $S_i$, initializing a segment set and an outlier set to empty sets and generating a current segment using a first point of the sequence $S_i$, determining whether a next point of the sequence $S_i$ satisfies geometric and semantic conditions using the bounding threshold values for the volume, the edge and the semantic factor, merging the next point of the sequence $S_i$ into the current segment if the geometric and semantic conditions are satisfied, and including the current segment in the segment set and updating the segment set by re-generating a new current segment using the next point of the sequence $S_i$, if the geometric and semantic conditions are not satisfied and the number of points contained in the current segment exceeds the minimum number of points per segment minPts.

18. The similarity search method according to claim 17, wherein at the geometric and semantic condition determination step, it is determined that the geometric and semantic conditions are satisfied if the following Equation [6] is satisfied:

$$\Delta \text{Vol}(VS,P) \leq \tau_{vol}, \Delta \text{Edge}(VS,P) \leq \tau_{edge}, \text{dist}(P_k,P_{k+1}) \leq \tau_{dist} \quad [6]$$

where $\Delta \text{Vol}(VS,P)$ is the difference between volumes of the current segment VS and a segment generated by merging the next point of the sequence $S_i$ into the current segment VS, $\Delta \text{Edge}(VS,P)$ is the difference between edge lengths of the current segment VS and the segment generated by merging the next point of the sequence $S_i$ into the current segment VS, dist ($P_k$, $P_{k+1}$) is the distance between two adjacent points in the segment, $\tau_{vol}$ is the bounding threshold value for the volume, $\tau_{edge}$ is the bounding threshold value for the edge, and $\tau_{dist}$ is the bounding threshold value for the semantic factor.

* * * * *